US009031594B2

(12) United States Patent
Matsuo et al.

(10) Patent No.: US 9,031,594 B2
(45) Date of Patent: May 12, 2015

(54) COMMUNICATION TERMINAL AND COMMUNICATION METHOD FOR TRANSMITTING A PROXIMITY INDICATION MESSAGE CONTAINING A SELECTED FREQUENCY WHEN APPROXIMATING AN ACCESS-RESTRICTED CELL

(75) Inventors: Hidenori Matsuo, Kanagawa (JP); Takahisa Aoyama, Kanagawa (JP); Takashi Tamura, Kanagawa (JP)

(73) Assignee: Panasonic Intellectual Property Corporation of America, Torrance, CA (US)

(*) Notice: Subject to any disclaimer, the term of this patent is extended or adjusted under 35 U.S.C. 154(b) by 393 days.

(21) Appl. No.: 13/521,815

(22) PCT Filed: Jan. 13, 2011

(86) PCT No.: PCT/JP2011/000138
§ 371 (c)(1),
(2), (4) Date: Jul. 12, 2012

(87) PCT Pub. No.: WO2011/086927
PCT Pub. Date: Jul. 21, 2011

(65) Prior Publication Data
US 2012/0289274 A1 Nov. 15, 2012

(30) Foreign Application Priority Data

Jan. 15, 2010 (JP) ................................ 2010-007176

(51) Int. Cl.
*H04W 48/02* (2009.01)
*H04W 36/32* (2009.01)
(Continued)

(52) U.S. Cl.
CPC .............. *H04W 48/02* (2013.01); *H04W 36/32* (2013.01); *H04W 48/06* (2013.01); *H04W 88/08* (2013.01)

(58) Field of Classification Search
None
See application file for complete search history.

(56) References Cited

U.S. PATENT DOCUMENTS

2007/0123265 A1* 5/2007 Moon ........................... 455/449
2009/0047960 A1* 2/2009 Gunnarsson et al. ......... 455/436
(Continued)

FOREIGN PATENT DOCUMENTS

JP 2009-49661 A 3/2009
JP 2009-268105 A 11/2009

OTHER PUBLICATIONS
3GPP TSG-RAN WG2 #68, R2-09700, Jeju, Korea, Nov. 9-13, 2009; NTT Docomo, Inc, "CSG inbound handover—way forward".
(Continued)

*Primary Examiner* — Nay A Maung
*Assistant Examiner* — Alejandro Rivero
(74) *Attorney, Agent, or Firm* — Pearne & Gordon LLP

(57) ABSTRACT

A communication terminal includes: a notification information acquiring section which acquires notification information containing information related to all frequencies allocated to cells provided by a base station that provides access-restricted cells; a frequency information storing section which stores cell information containing information contained in the notification information; a frequency selecting section which selects one arbitrary frequency from a plurality of frequencies provided by an access-restricted base station to be accessible in a past when detecting that the communication terminal approximates to a cell of the access-restricted base station to be accessible in the past, based on the notification information and the cell information; and a transmitting section which transmits the proximity indication message containing the frequency selected by the frequency selecting section, to the base station that provides the currently connected cell.

7 Claims, 22 Drawing Sheets

(51) Int. Cl.
*H04W 48/06* (2009.01)
*H04W 88/08* (2009.01)

(56) References Cited

U.S. PATENT DOCUMENTS

2009/0270104 A1 10/2009 Du et al.
2010/0041364 A1* 2/2010 Lott et al. .................. 455/404.1
2011/0171962 A1 7/2011 Iwamura et al.
2012/0208556 A1* 8/2012 Jung et al. .................. 455/456.1

OTHER PUBLICATIONS

International Search Report for PCT/JP2011/000138 dated Apr. 12, 2011.

* cited by examiner

COMMUNICATION TERMINAL AND COMMUNICATION METHOD FOR TRANSMITTING A PROXIMITY INDICATION MESSAGE CONTAINING A SELECTED FREQUENCY WHEN APPROXIMATING AN ACCESS-RESTRICTED CELL

TECHNICAL FIELD

The present invention relates to a communication terminal and communication method in which a proximity indication message is transmitted to a currently connected base station when approximating to an access-restricted cell provided by a base station that supports a plurality of access-restricted cells at different frequencies.

BACKGROUND ART

<CSG (Closed Subscriber Group) Cell>

In the 3GPP, a base station managed by the CSG (Closed Subscriber Group) (hereinafter, referred to as "CSG base station") is studied which provides a cell that is called a CSG cell, and that issues an access permission to a specific user. As a CSG base station, for example, a Home eNodeB (HeNB or a Home NodeB: HNB) may be contemplated.

FIG. 19 shows the architecture configuration of a CSG base station system. As shown in FIG. 19, CSG cells are constructed in a cell (macro cell) constructed by a usual macro base station (eNB). Unlike a macro base station, a CSG base station is provided with a function that can restrict an accessible terminal (User Equipment: hereinafter referred to as "UE"). Therefore, a UE can be connected only to a CSG cell having an access permission. Even when a CSG cell having a very high quality is detected, a UE cannot be connected to the CSG cell without an access permission, except in an emergency.

When a UE is to check an access permission of a CSG cell, the UE must check cell identification information contained in notification information sent from a CSG base station. Each CSG cell has an ID called "CSG ID" in a unit of group, and gives an access permission to a UE in a unit of CSG ID. The UE collates "CSG ID list" (access permission list: called "CSG white list") of accessible CSG cells which is notified by a network, with a CSG ID which is cell identification information contained in notification information sent from a detected CSG base station. When the CSG ID of the detected CSG cell is contained in the CSG white list, the UE determines that access is enabled. In the following description, a CSG ID is referred to as "access permission information".

<PCI Confusion>

All cells have cell identification information which is called a Physical Cell ID (PCI). With respect to CSG cells, there is a case where, as shown in FIG. 20, a plurality of CSG cells having the same PCI exist in the vicinity of a serving cell provided by a serving base station to which the UE is currently connected.

The UE measures the reception quality of a signal sent from a peripheral cell, and is triggered when the measured reception quality of the serving cell or peripheral cell satisfies conditions. This is called event trigger. When the event trigger is activated, the UE notifies the serving cell of the PCI of a cell having a high reception quality by using a measurement report message. Based on the information of the reception quality contained in the measurement report message, the serving base station determines the handover destination of the UE, and transmits a handover request (HO request) message to the base station of the handover destination. At this time, in the case where a plurality of CSG cells having the same PCI exist in the vicinity of the serving base station, there is a possibility that the serving base station may transmit a handover request (HO request) message to a base station of an erroneous CSG cell. This is called "PCI confusion". FIG. 20 shows a PCI confusion.

<Operation Before Handover>

FIG. 21 shows the procedure for a measurement report message which is an operation before a handover, the message containing a CSG cell. A UE holds past information (fingerprint) of cells to which it has been connected in the past. As shown in FIG. 21, when approximation to a CSG cell to which an access permission has been issued is detected based on the past information, the UE notifies the serving base station of one of frequencies of the CSG cell, by means of a proximity indication message. In the case where the frequency notified by the proximity indication message is not contained in the measurement configuration information, the serving base station notifies the UE of the configuration information by means of a measurement configuration message. Therefore, the UE can immediately detect and measure a CSG cell having an access permission.

In order to prevent a PCI confusion from occurring, a UE detects a Cell Global ID (CGI) which is a unique cell identifier contained in notification information sent from a CSG base station, and notifies a serving base station of the CGI by means of the measurement report message, so that the serving base station identifies a CSG cell. However, it takes time before the UE receives the notification information from the CSG base station. Therefore, the UE first notifies the serving base station of the ID (PCI) of a cell having a high reception quality and the measured reception quality, by means of a first measurement report message. The serving base station selects one cell which is a handover destination candidate, from cells contained in the received first measurement report message. In the case where the selected cell is a CSG cell, and, as a result of a check of proximity information, is a cell corresponding to a frequency notified by the proximity indication message, in order to instruct the UE to detect the CGI of the CSG cell, the serving base station notifies the UE of a measurement configuration message containing configuration information which is necessary for detecting the PCI and CGI of the CSG cell. Based on the measurement configuration message, the UE receives notification information of the instructed CSG cell to acquire System Information (SI) containing CSG cell information such as the CGI. This process is called "SI reading". By using access permission information (CSG ID) contained in the CSG cell information, the UE checks the existence of an access permission. The UE notifies the serving base station of the cell information of the CSG cell and the result of the access check after the access permission checking process, by means of a second measurement report message. This process is called "SI report".

CITATION LIST

Non-Patent Literature

Non-patent Literature 1: 3GPP TSG-RAN WG2 Meeting #68, R2-097000, "CSG inbound handover-way forward"

SUMMARY OF THE INVENTION

Technical Problem

FIG. 22 shows a CSG base station which provides a plurality of frequencies and a plurality of cells. Only one frequency can be notified by a proximity indication message. In the case where, as shown in FIG. 22, the CSG base station supports a plurality of CSG cells (for example, CSG cell 1 and CSG cell 2) by using different frequencies (for example, f1 and f2), when a plurality of frequencies are recorded in a UE as past information (fingerprint) of CSG cells to which the UE has been connected in the past, therefore, the UE transmits a plurality of times the proximity indication messages to a serving base station. The number at which the proximity indication messages are transmitted is increased in accordance with the number of the pertinent frequencies, thereby increasing the signaling amount.

It is an object of the invention to provide a communication terminal and communication method whereby to reduce the signaling amount of a proximity indication message that is to be transmitted to a currently connected base station when approximating to an access-restricted cell provided by a base station that supports a plurality of access-restricted cells at different frequencies.

Solution to Problem

The present invention provides a communication terminal which transmits a proximity indication message to a base station that provides a currently connected cell when approximating to an access-restricted cell provided by a base station that provides a plurality of access-restricted cells at different frequencies, the communication terminal including: a notification information acquiring section which acquires notification information containing information related to all frequencies allocated to the access-restricted cells provided by the base station that provides the access-restricted cells; a frequency information storing section which stores cell information containing information contained in the notification information; a frequency selecting section which selects one arbitrary frequency from a plurality of frequencies provided by an access-restricted base station to be accessible in the past when detecting that the communication terminal approximates to an access-restricted cell of the access-restricted base station to be accessible in the past, based on the notification information acquired by the notification information acquiring section and the cell information stored by the frequency information storing section; and a transmitting section which transmits the proximity indication message containing the frequency selected by the frequency selecting section, to the base station that provides the currently connected cell.

The present invention provides a communication method which is executed by a communication terminal which transmits a proximity indication message to a base station that provides a currently connected cell when approximating to an access-restricted cell provided by a base station that provides a plurality of access-restricted cells at different frequencies, the communication method including: a notification information acquiring step of acquiring notification information containing information related to all frequencies allocated to the access-restricted cells provided by the base station that provides the access-restricted cells; a frequency information storing step of storing cell information containing information contained in the notification information; a frequency selecting step of selecting one arbitrary frequency from a plurality of frequencies provided by an access-restricted base station to be accessible in a past, when detecting that the communication terminal approximates to an access-restricted cell of the access-restricted base station to be accessible in a past, based on the notification information acquired in the notification information acquiring step and the cell information stored in the frequency information storing step; and a transmitting step of transmitting the proximity indication message containing the frequency selected in the frequency selecting step, to the base station that provides the currently connected cell.

Advantageous Effects of the Invention

According to the communication terminal and communication method in a aspect of the invention, it is possible to reduce the signaling amount of a proximity indication message which is transmitted by the communication terminal to a currently connected base station.

MODES FOR CARRYING OUT THE INVENTION

Hereinafter, embodiments of the invention will be described with reference to the drawings.

First Embodiment

When handovered to one CSG cell, switching to a CSG cell of another frequency in the same CSG base station is easy. In a first embodiment, therefore, it is sufficient to perform only one proximity indication, related to the UE, which is done by a UE on a serving base station, which is directed to a CSG cell provided by the same CSG base station. Even in the case where approximating to a cell of a CSG base station that supports a plurality of frequencies, when proximity indication is to be performed, namely, the UE notifies the serving base station of only one frequency.

Figure 1:
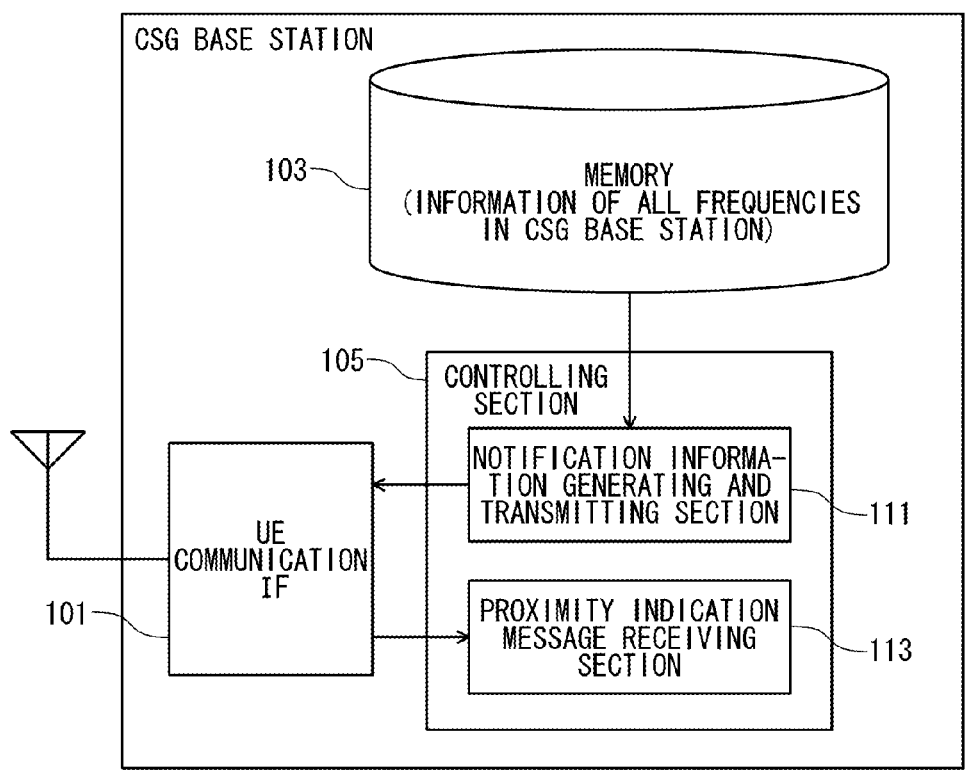
FIG. 1 shows the configuration of a CSG base station in a first embodiment.

FIG. 1 shows the configuration of the CSG base station in the first embodiment. As shown in FIG. 1, the CSG base station in the first embodiment includes a UE communication interface section (UE communication IF) 101, a memory 103, and a controlling section 105. The controlling section 105 has a notification information generating and transmitting section 111, and a proximity indication message receiving section 113.

The UE communication IF 101 is an interface for communicating with a UE. The memory 103 stores information (frequency information) related to all frequencies allocated to CSG cells provided by the CSG base station. The notification information generating and transmitting section 111 of the controlling section 105 generates notification information based on the frequency information stored in the memory 103, and transmits the notification information via the UE communication IF 101. The proximity indication message receiving section 113 of the controlling section 105 receives a proximity indication message notified from a UE.

Figure 2:
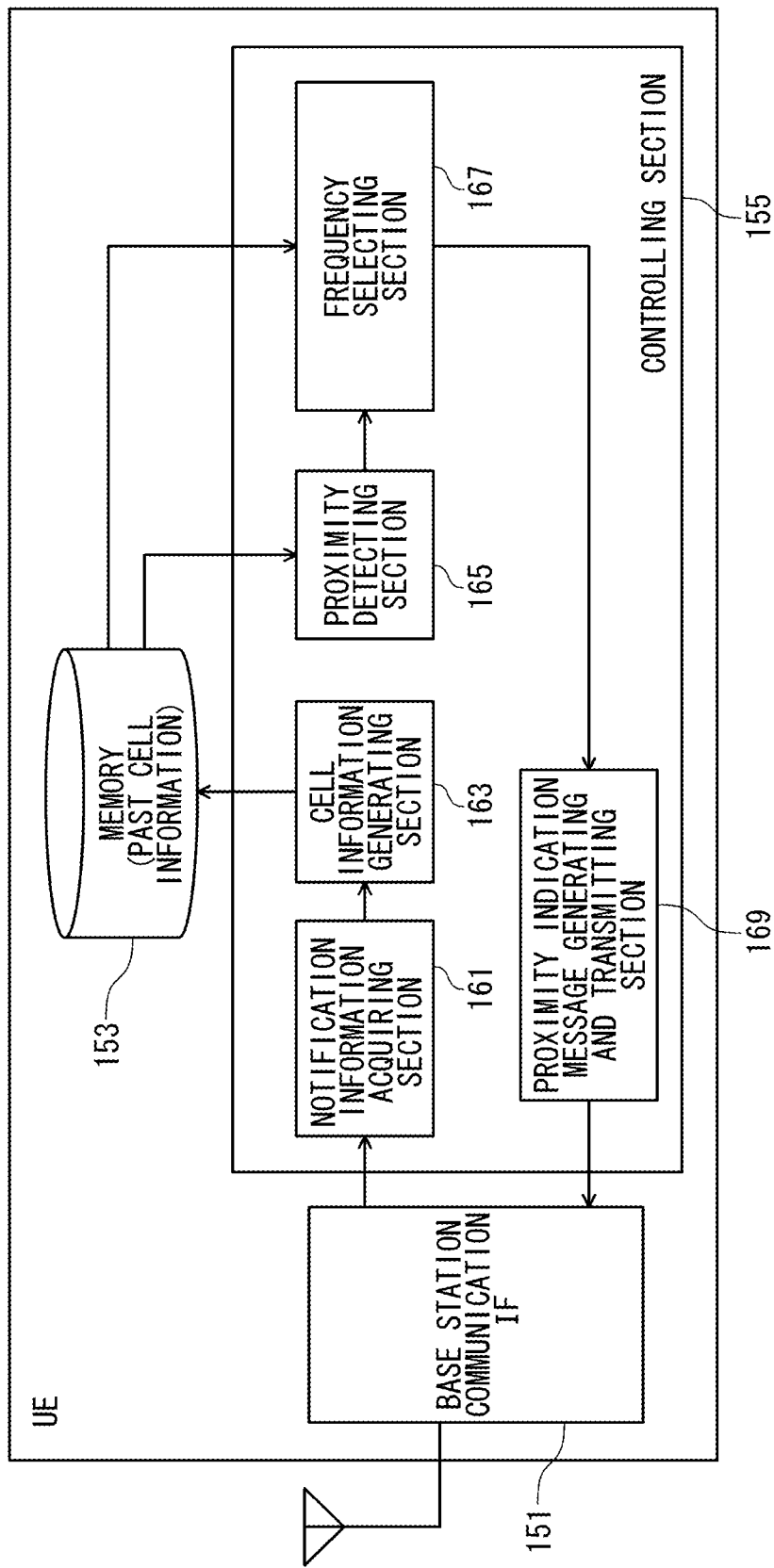
FIG. 2 shows the configuration of a UE of the first embodiment.

FIG. 2 shows the configuration of a UE of the first embodiment. As shown in FIG. 2, the UE of the first embodiment includes a base station communication interface section (base station communication IF) 151, a memory 153, and a controlling section 155. The controlling section 155 has a notification information acquiring section 161, a cell information generating section 163, a proximity detecting section 165, a frequency selecting section 167, and a proximity indication message generating and transmitting section 169.

The base station communication IF 151 is an interface for communicating with a base station. The memory 153 stores past information (fingerprint) of CSG cells to which the UE has been connected in the past. The notification information acquiring section 161 of the controlling section 155 acquires the notification information sent from the CSG base station via the base station communication IF 151. The cell information generating section 163 of the controlling section 155 generates cell information containing frequency information related to an accessible CSG cell, based on the notification information acquired by the notification information acquiring section 161. The proximity detecting section 165 of the controlling section 155 detects that the UE approximates to a CSG cell to which an access permission has been issued, based on the notification information acquired by the notification information acquiring section 161 and the past cell information stored in the memory 153. The frequency selecting section 167 of the controlling section 155 selects one frequency from a plurality of frequencies provided by the same CSG base station, by a selection method which will be described below. The proximity indication message generating and transmitting section 169 of the controlling section 155 generates a proximity indication message for indicating the frequency selected by the frequency selecting section 167, to the serving base station, and transmits the proximity indication message.

Figure 3:
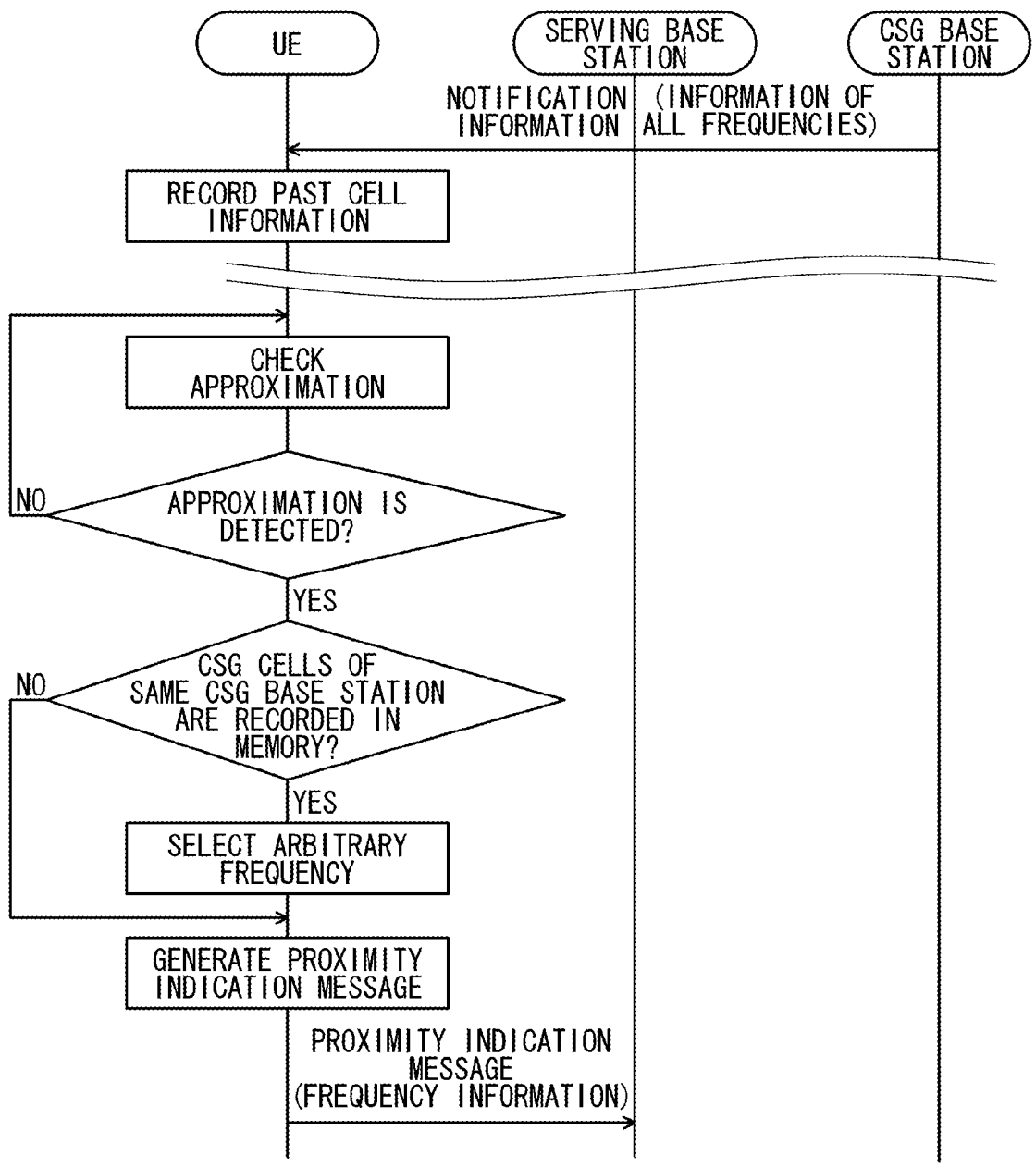
FIG. 3 is a flowchart in the first embodiment.

FIG. 3 is a flowchart in the system in the first embodiment. As shown in FIG. 3, the CSG base station notifies the frequency information provided by the CSG base station. Upon receiving the notification information, the UE records cell information containing frequency information related to a CSG cell which has been accessible, in the memory 153. When the UE detects that it approximates to a cell of a CSG base station to be accessible in the past, based on past information (fingerprint), being stored in the memory 153, of a cell to which the UE has been connected in the past, the UE selects one arbitrary frequency from a plurality of frequencies provided by the same CSG base station, and notifies the serving base station of the selected frequency by means of a proximity indication message.

According to the embodiment, only one proximity indication message related to a plurality of CSG cells provided by the same CSG base station is transmitted. As compared with the conventional case where a plurality of messages are transmitted, therefore, the signaling amount of a proximity indication message from the UE to the serving base station can be reduced.

Second Embodiment

In the first embodiment, in the case where the UE is to select the frequency which is transmitted by means of the proximity indication message, the UE selects one arbitrary frequency of a plurality of frequencies provided by the same CSG base station. In a second embodiment, a UE selects one frequency based on priority information (hereinafter, referred to as "frequency priority information") of a frequency which is set by a CSG base station in accordance with states such as interference at each frequency and the traffic.

Figure 4:
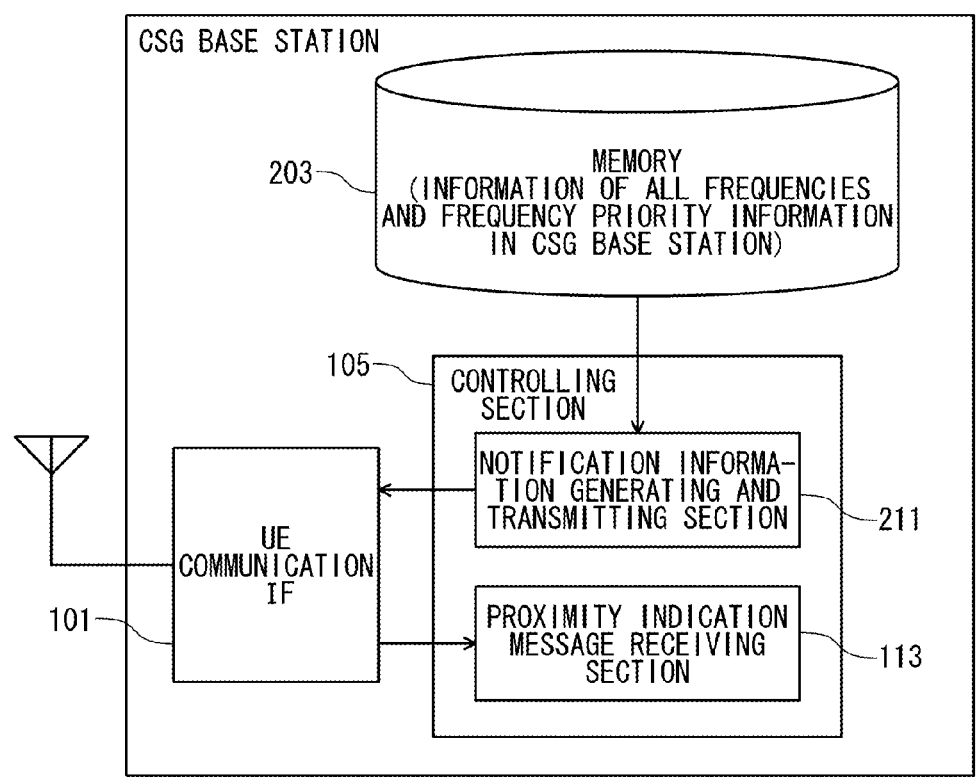
FIG. 4 shows the configuration of a CSG base station in a second embodiment.

FIG. 4 shows the configuration of a CSG base station in the second embodiment. The CSG base station in the second embodiment is different in a memory 203 and a notification information generating and transmitting section 211 from that in the first embodiment. The CSG base station is similar to that in the first embodiment except this point, and, in FIG. 4, the components which are common to FIG. 1 are denoted by the same reference numerals. The memory 203 in the embodiment stores the frequency information of CSG cells provided by the CSG base station, and the frequency priority information which will be described later. The notification information generating and transmitting section 211 in the embodiment generates notification information based on the frequency information and frequency priority information stored in the memory 203, and transmits the notification information via the UE communication IF 101.

Figure 5:
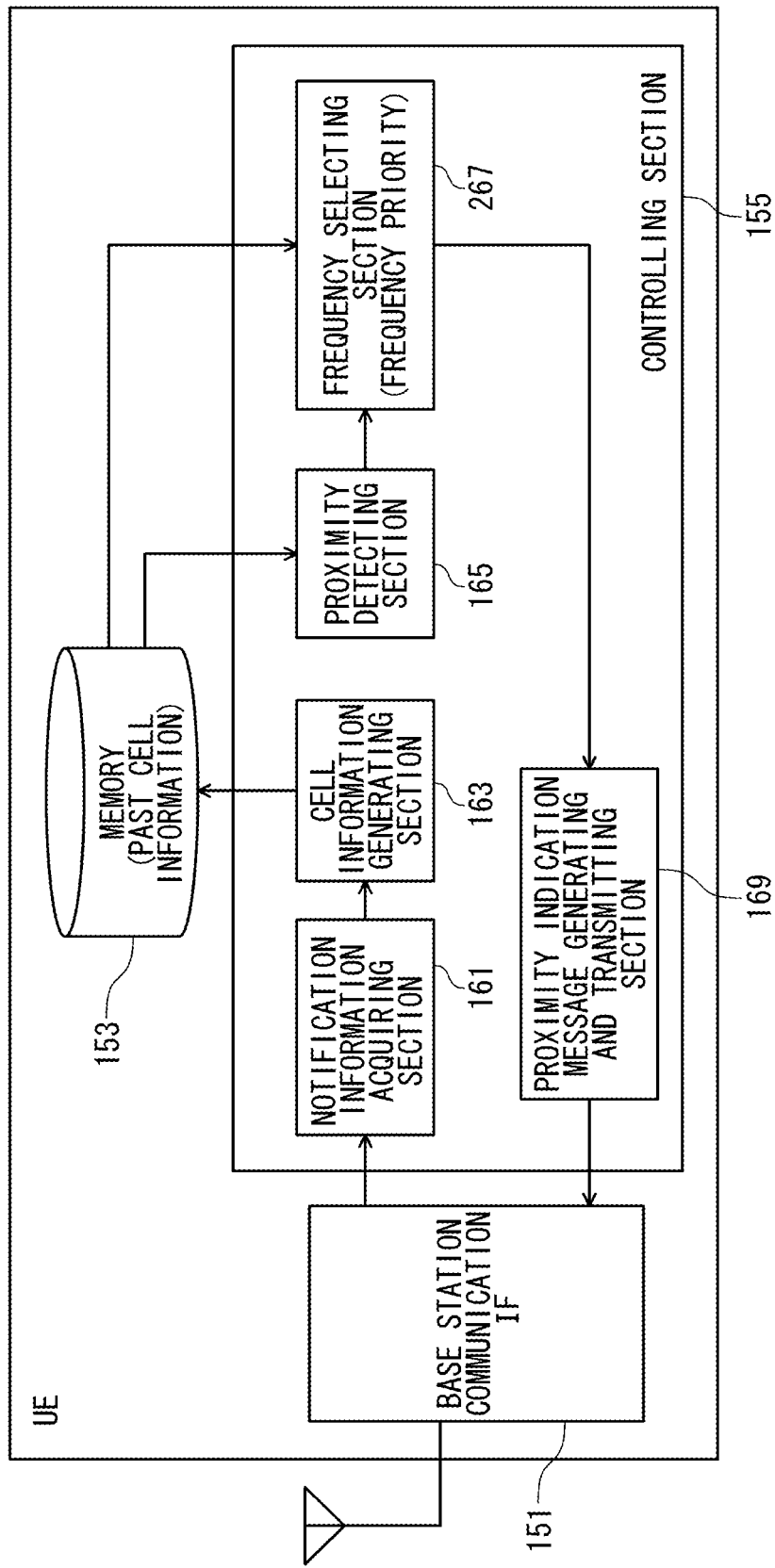
FIG. 5 shows the configuration of a UE of the second embodiment.

FIG. 5 shows the configuration of the UE of the second embodiment. The UE of the second embodiment is different in a frequency selecting section 267 from that of the first embodiment. The UE is similar to that of the first embodiment except this point, and, in FIG. 5, the components which are common to FIG. 2 are denoted by the same reference numerals. The frequency selecting section 267 in the embodiment selects one frequency from a plurality of frequencies provided by the same CSG base station, by a selection method which will be described below.

Figure 6:
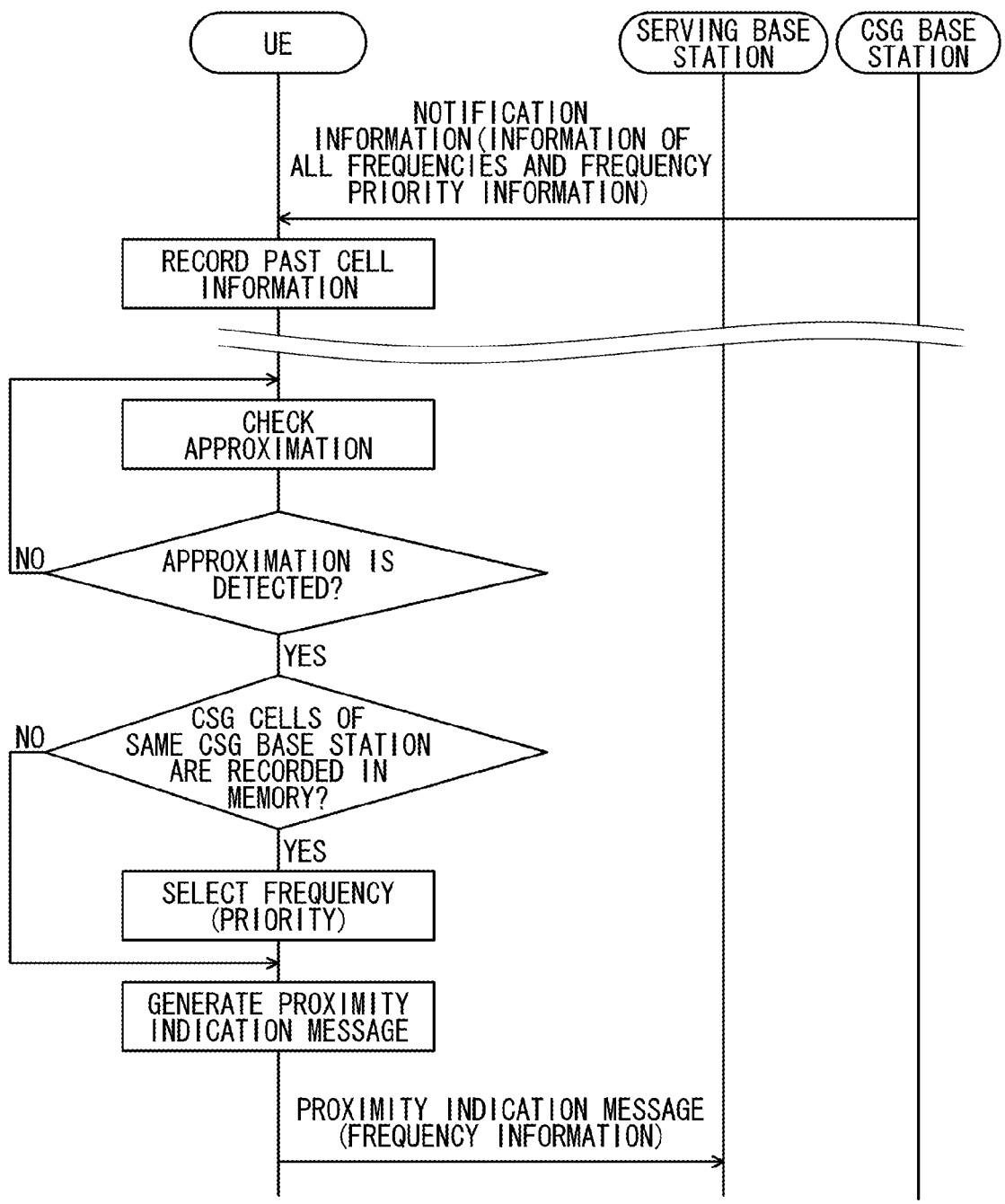
FIG. 6 is a flowchart in the second embodiment.

FIG. 6 is a flowchart in the system in the second embodiment. As shown in FIG. 6, the CSG base station notifies the frequency priority information of each frequency in addition to the frequency information provided by the CSG base station. Usually, a frequency having a higher priority is a frequency which is intended by the CSG base station to be used preferentially by the UE. As the frequency priority information, therefore, priority flag information is set only in, for example, a frequency which has the highest priority in the CSG base station.

Upon receiving the notification information, the UE records cell information containing frequency information related to a CSG cell which has been accessible, and the frequency priority information, in the memory 153. When the UE detects that it approximates to a cell of a CSG base station to be accessible in the past, based on past information (fingerprint) of a cell to which the UE has been connected in the past, the past information being stored in the memory 153, the UE selects one frequency of a plurality of frequencies provided by the same CSG base station, the arbitrary frequency having the highest priority indicated by the frequency priority information, and notifies the serving base station of the selected frequency by means of a proximity indication message.

According to the embodiment, a frequency which is optimum according to the status of the CSG base station is selected by the UE.

Third Embodiment

In the second embodiment, when the UE is to select the frequency which is notified by means of the proximity indication message, the UE selects one frequency of a plurality of frequencies provided by the same CSG base station, based on the frequency priority information. In a third embodiment, a UE selects one frequency based on coverage information indicative of the size of the cell range of each CSG cell.

Figure 7:
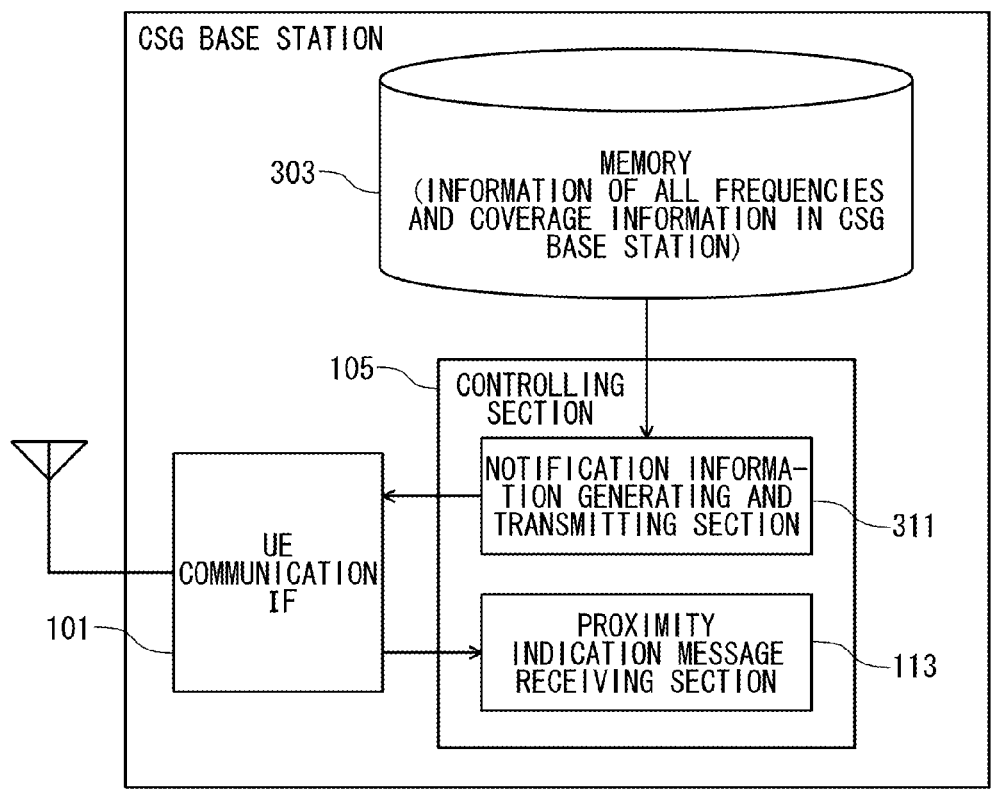
FIG. 7 shows the configuration of a CSG base station in a third embodiment.

FIG. 7 shows the configuration of a CSG base station in the third embodiment. The CSG base station in the third embodiment is different in a memory 303 and a notification information generating and transmitting section 311 from that in the first embodiment. The CSG base station is similar to that in the first embodiment except this point, and, in FIG. 7, the components which are common to FIG. 1 are denoted by the same reference numerals. The memory 303 in the embodiment stores the frequency information of CSG cells provided by the CSG base station, and the coverage information which will be described later. The notification information generating and transmitting section 311 in the embodiment generates notification information based on the frequency information and coverage information stored in the memory 303, and transmits the notification information via the UE communication IF 101.

Figure 8:
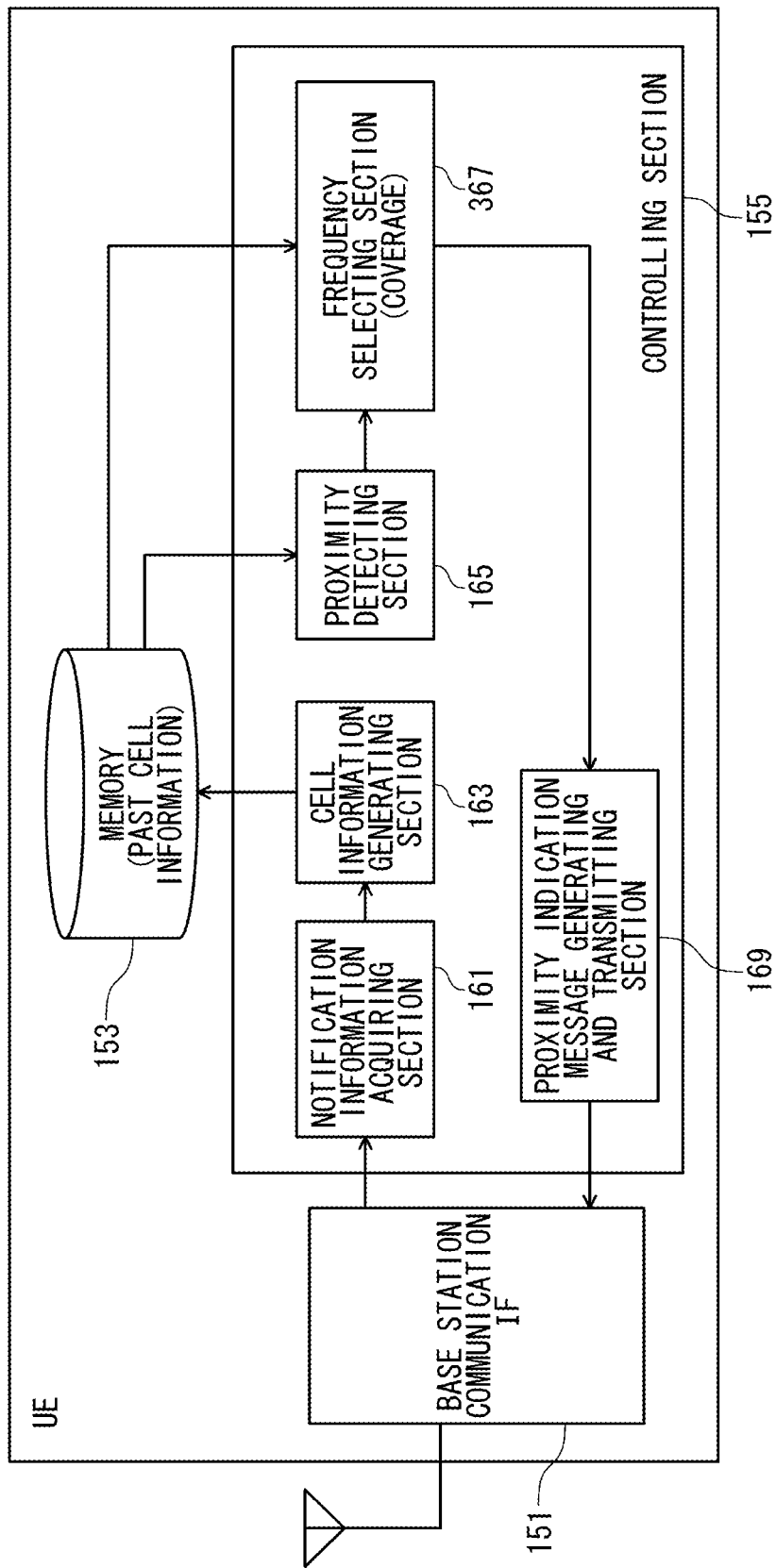
FIG. 8 shows the configuration of a UE of the third embodiment.

FIG. 8 shows the configuration of the UE of the third embodiment. The UE of the third embodiment is different in a frequency selecting section 367 from that of the first embodiment. The UE is similar to that of the first embodiment except this point, and, in FIG. 8, the components which are common to FIG. 2 are denoted by the same reference numerals. The frequency selecting section 367 in the embodiment selects one frequency from a plurality of frequencies provided by the same CSG base station, by a selection method which will be described below.

Figure 9:
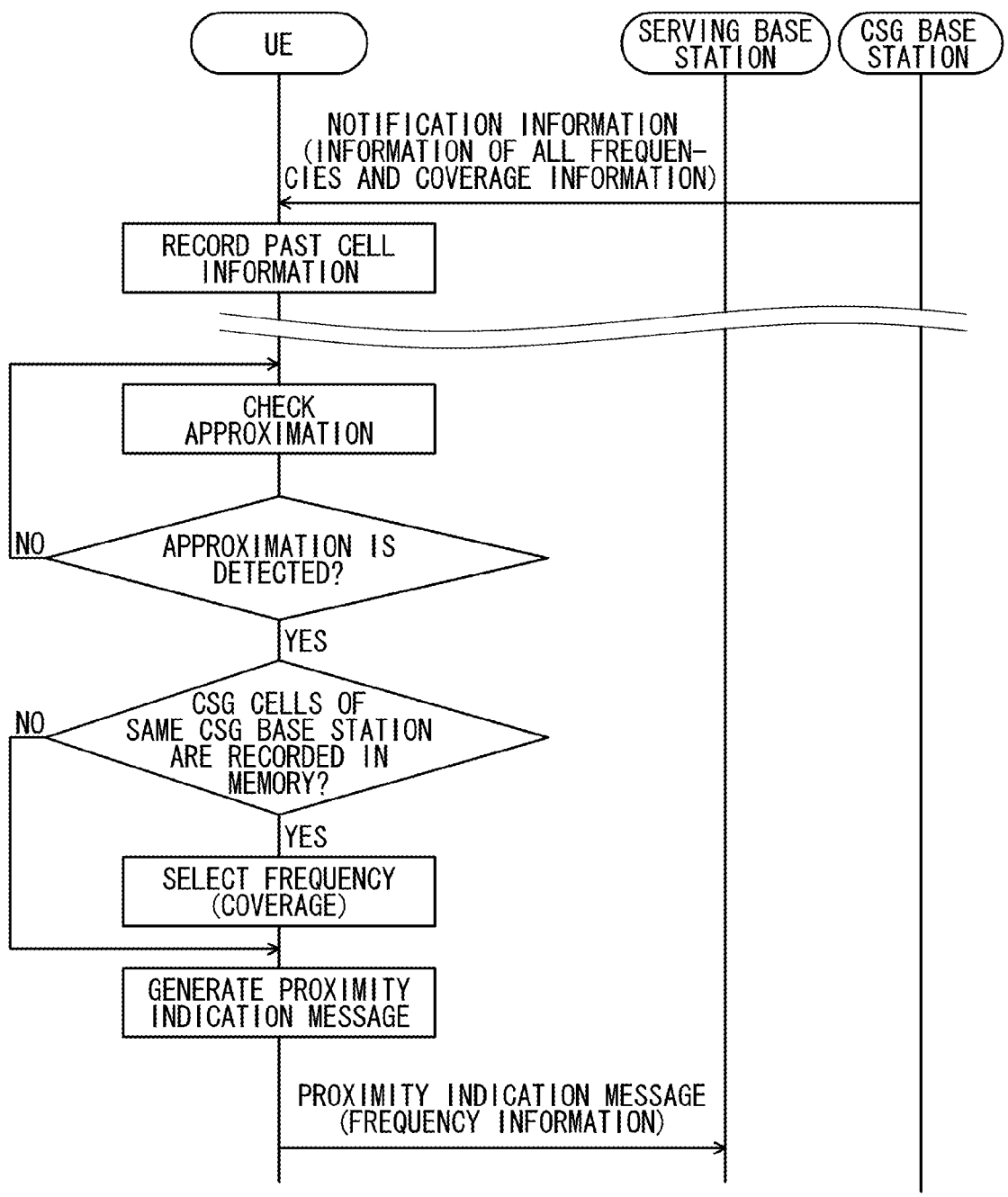
FIG. 9 is a flowchart in the third embodiment.

FIG. 9 is a flowchart in the system in the third embodiment. As shown in FIG. 9, the CSG base station notifies the coverage information of CSG cells corresponding respectively to frequencies in addition to the frequency information provided by the CSG base station. As the coverage of a CSG cell is larger, the UE can detect earlier the CSG cell. As the coverage information, therefore, coverage flag information is set only in, for example, a frequency corresponding to a CSG cell which has the largest coverage in the CSG base station.

Upon receiving the notification information, the UE records cell information containing frequency information and coverage information related to a CSG cell which has been accessible, in the memory 153. When the UE detects that it approximates to a cell of a CSG base station to be accessible in the past, based on past information (fingerprint), being stored in the memory 153, of a cell to which the UE has been connected in the past, the UE selects one frequency having the largest coverage among a plurality of frequencies provided by the same CSG base station, and notifies the serving base station of the selected frequency by means of a proximity indication message.

According to the embodiment, a frequency at which the UE can rapidly detect a CSG cell is selected by the UE.

Fourth Embodiment

In the third embodiment, when the UE is to select the frequency which is notified by means of the proximity indication message, the UE selects one frequency of a plurality of frequencies provided by the same CSG base station, based on the coverage information of a CSG cell. In a fourth embodiment, in the case where there is no frequency of a CSG cell which is identical with the frequency (hereinafter, referred to as "serving frequency") of a serving cell, the method of selecting the frequency is changed in accordance with the traveling speed of a UE.

A CSG base station in the fourth embodiment is similar to that in the third embodiment.

Figure 10:
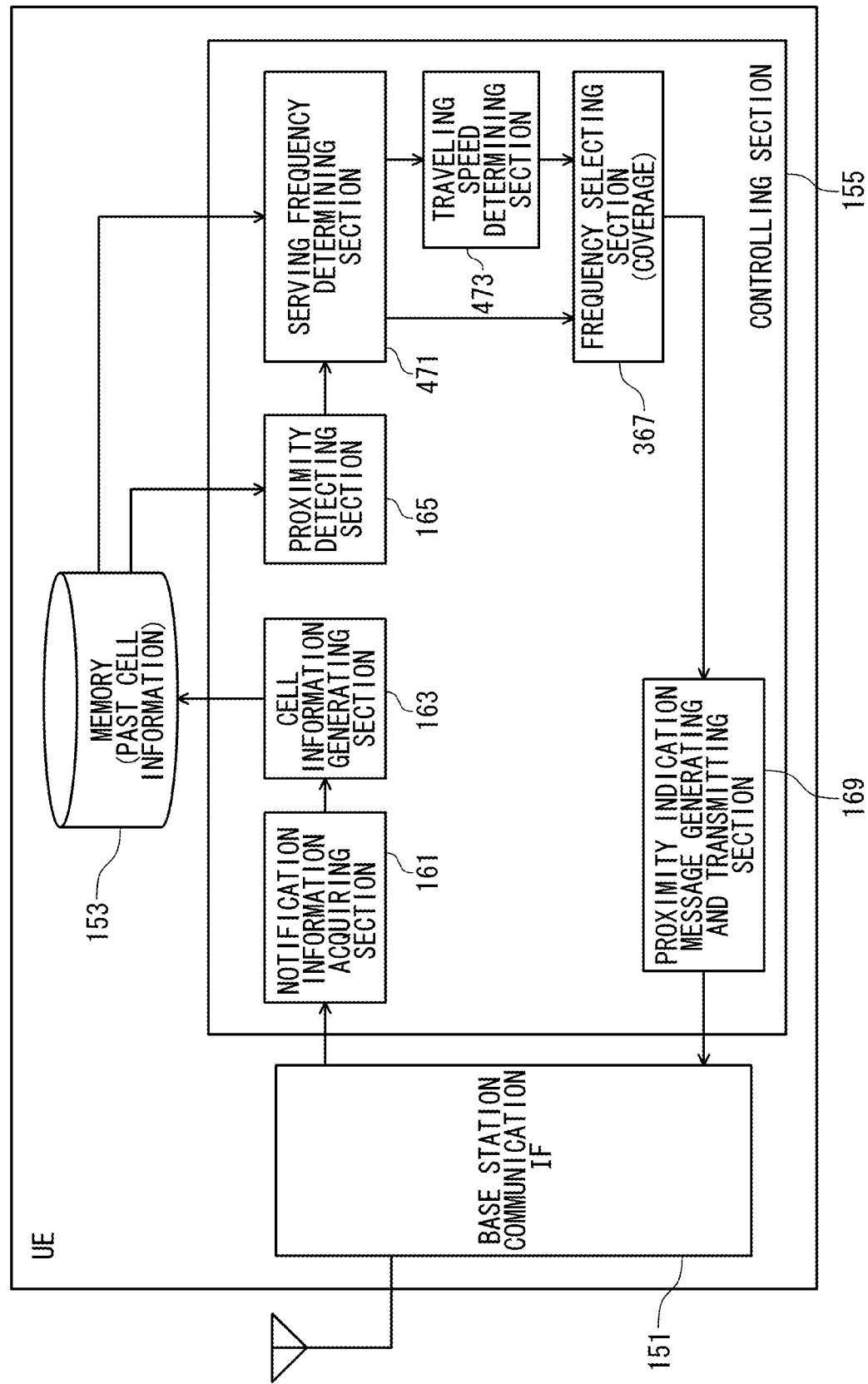
FIG. 10 shows the configuration of a UE of a fourth embodiment.

FIG. 10 shows the configuration of a UE of the fourth first embodiment. As shown in FIG. 10, the UE of the fourth first embodiment includes, in addition to the components of the UE of the third embodiment, a serving frequency determining section 471 and a traveling speed determining section 473. The UE is similar to that of the first embodiment except this point, and, in FIG. 10, the components which are common to FIG. 1 are denoted by the same reference numerals. The serving frequency determining section 471 determines whether the frequency of a CSG cell to which the UE approximates is the serving frequency or not. The traveling speed determining section 473 determines the traveling speed of the UE.

In the case where a UE enters the coverage of a CSG cell to which the serving frequency is allocated, when the UE continues to be connected to a serving cell, the UE provides interference to the CSG cell because a serving cell and a CSG cell use the same frequency. Therefore, the UE is required to rapidly handover to the CSG cell. With respect to a CSG cell of the serving frequency, consequently, the UE is required to immediately detect the CSG cell. In this case, therefore, the UE of the embodiment selects the frequency of a CSG cell having the largest coverage.

By contrast, in the case where a UE enters the coverage of a CSG cell to which a frequency other than the serving frequency is allocated, even when the UE continues to be connected to a serving cell, the UE does not provide interference to the CSG cell because a serving cell and a CSG cell use different frequencies. Therefore, the UE is not required to rapidly perform handover to the CSG cell. With respect to a CSG cell to which a frequency other than the serving frequency is allocated, consequently, the UE is not required to immediately detect the CSG cell. In this case, therefore, it is not always necessary that the UE of the embodiment selects the frequency of a CSG cell having the largest coverage.

In the case where the traveling speed of a UE is high, even when the UE handovers to a CSG cell having a coverage which is relatively small as compared to a macro cell, a handover to another cell is immediately performed. As a result, handovers frequently occur, and hence there arise problems such as a reduction of the communication speed, an increase of the signaling amount, and that of the power consumption. In the case where the traveling speed of a UE is high, when the UE selects the frequency of a CSG cell having the smallest coverage, consequently, the possibility that the UE detects a CSG cell is reduced, and the possibility that the UE handovers to a macro cell is increased. Therefore, the risk of frequent occurrence of a handover can be reduced. In order to prevent a UE from detecting a CSG cell and performing a handover, when the traveling speed of a UE is high, the UE may not transmit a proximity indication message itself. In the case where there is a CSG cell having a coverage which is larger than that of a macro cell, the frequency of a CSG cell having the largest coverage may be selected irrespective of the traveling speed of a UE.

With respect to a CSG cell to which the serving frequency is allocated, from the viewpoint of interference between a UE and the CSG cell, as described above, an influence is exerted on another UE or a base station. Even when the traveling speed of a UE is high, therefore, the selection of the frequency of a CSG cell having the largest coverage has a priority. By contrast, with respect to a CSG cell to which a frequency other than the serving frequency is allocated, the interference problem does not occur. In the case where the traveling speed of a UE is high, when the UE selects the frequency of a CSG cell having the smallest coverage, therefore, a handover can be prevented from frequently occurring as described above. In the case where the traveling speed of a UE is low, a handover does not frequently occur, and hence the UE selects the frequency of a CSG cell having the largest coverage.

Figure 11:
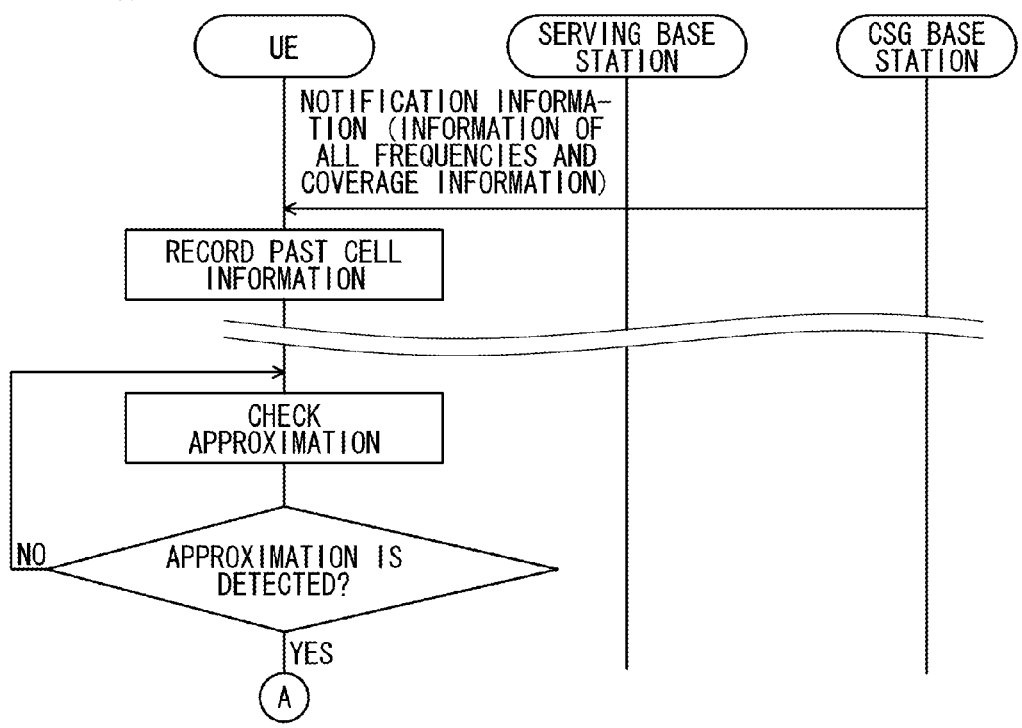
FIG. 11 is a flowchart in the fourth embodiment.
Figure 12:
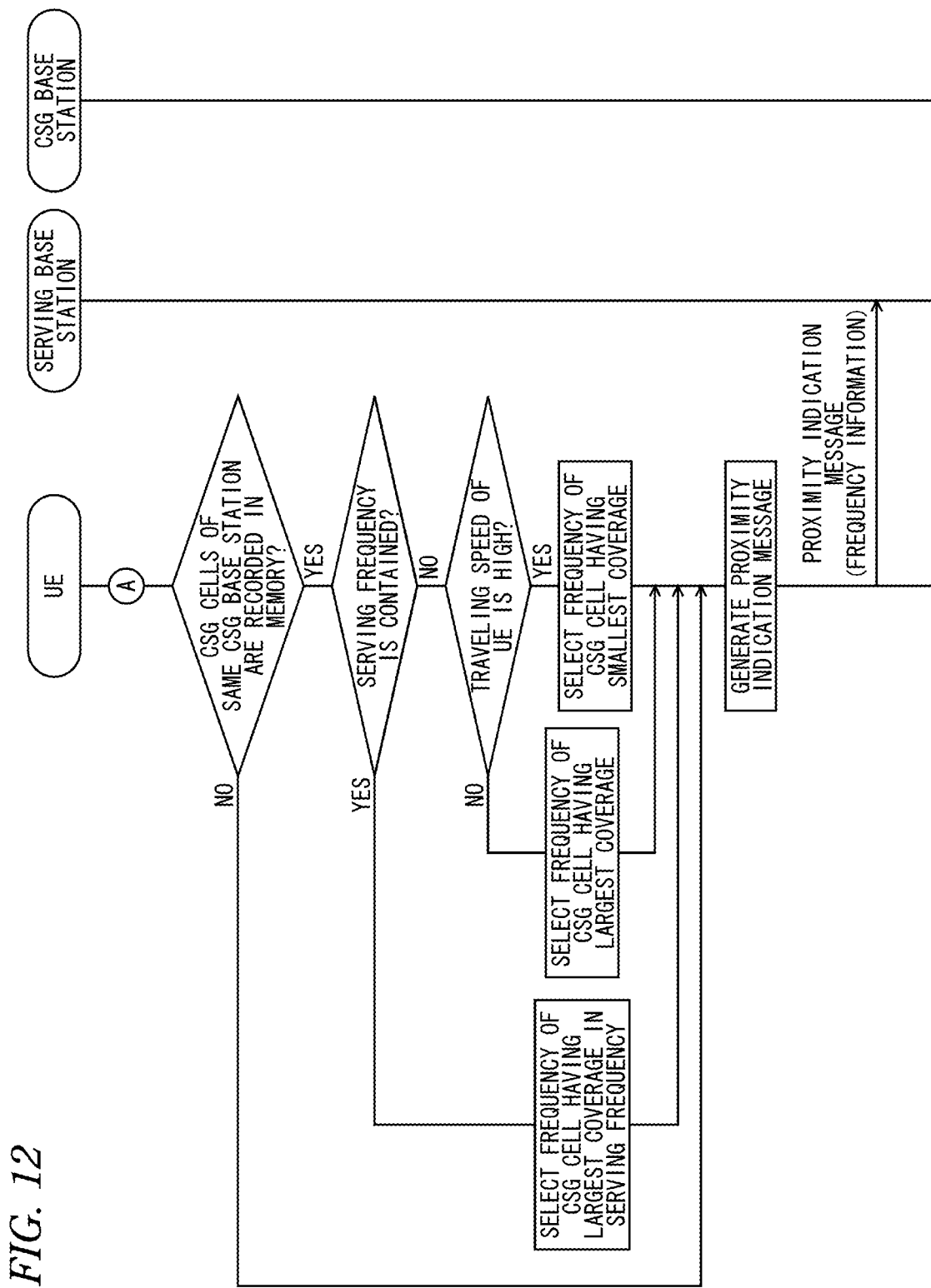
FIG. 12 is a flowchart in the fourth embodiment.

FIGS. 11 and 12 are flowcharts in the system in the fourth embodiment. As shown in FIGS. 11 and 12, a CSG base station notifies of coverage information in a similar manner as the third embodiment. Also the method in which the UE records past cell information in the memory is similar to that in the third embodiment. When the UE detects that it approximates to a cell of a CSG base station to be accessible in the past, based on past information (fingerprint) of a cell to which the UE has been connected in the past, the past information being stored in the memory 153, the UE determines whether the serving frequency is contained in a plurality of frequencies provided by the same CSG base station or not. In the case where the technique in which a UE is connected at the same time to a plurality of CSG cells, and which is called carrier aggregation is applied, a plurality of serving frequencies exist.

In the case where there is a CSG cell to which the serving frequency is allocated, the UE selects a frequency corresponding to a CSG cell which has the largest coverage in CSG cells corresponding to the serving frequency. By contrast, in the case where there is no CSG cell to which the serving frequency is allocated, the UE determines whether the UE is in high-speed motion or not. For example, the traveling speed is calculated based on the common Doppler frequency of a UE. Therefore, the UE determines whether the UE is in high speed motion or not, depending on whether the calculated traveling speed exceeds a threshold which is preset by the base station or not. If the UE is in high-speed motion, the UE selects a frequency corresponding to a CSG cell having the smallest coverage. By contrast, if the UE is in low speed motion, the UE selects a frequency corresponding to a CSG cell having the largest coverage.

According to the embodiment, the method of selecting the frequency is changed in accordance with the traveling speed of a UE, whereby the risk of frequent occurrence of a handover can be reduced.

Fifth Embodiment

In a fifth embodiment, a CSG base station previously notifies of a frequency which should not be selected by a UE in the selection of a frequency that is to be notified by means of a proximity indication message. The UE selects one frequency from a plurality of frequencies provided by the same CSG base station, except for the frequency which should not be selected.

As an example of the frequency which should not be selected, there is a frequency which, in the case where a CSG base station supports carrier aggregation, is called an extension carrier, and which provides a cell that alone cannot perform communication. Therefore, it is not necessary for a UE to immediately detect a CSG cell having an extension carrier, and hence the frequency corresponding to the CSG cell should not be selected. In addition, in the case where a CSG base station provides a CSG cell having a function which is called "Cell DTX", and in which "a base station performs intermittent transmission in order to reduce power consumption", the CSG base station intermittently performs transmission, and therefore it takes time for the UE to detect the cell. Consequently, the UE should not select the frequency corresponding to the CSG cell.

Figure 13:
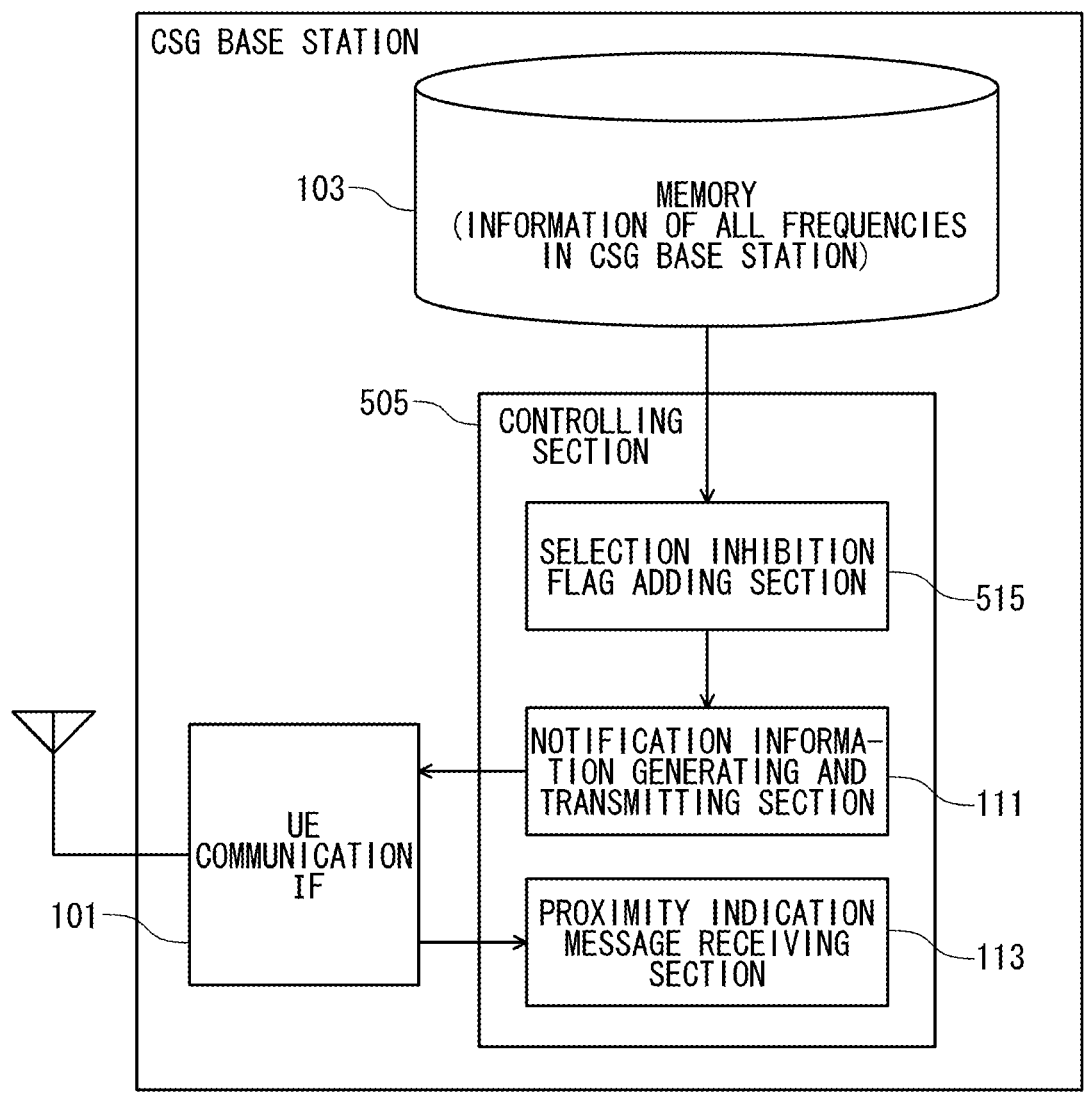
FIG. 13 shows the configuration of a CSG base station in a fifth embodiment.

FIG. 13 shows the configuration of a CSG base station in the fifth embodiment. The CSG base station in the fifth embodiment is different in a controlling section 505 from that in the first embodiment. The controlling section 505 in the fifth embodiment has a selection inhibition flag adding section 515 in addition to the components of the controlling section 105 in the first embodiment. The controlling section is similar to that in the first embodiment except this point, and, in FIG. 13, the components which are common to FIG. 1 are denoted by the same reference numerals. The selection inhibition flag adding section 515 in the embodiment adds a selection inhibition flag to a frequency which should not be notified by means of a proximity indication message.

Figure 14:
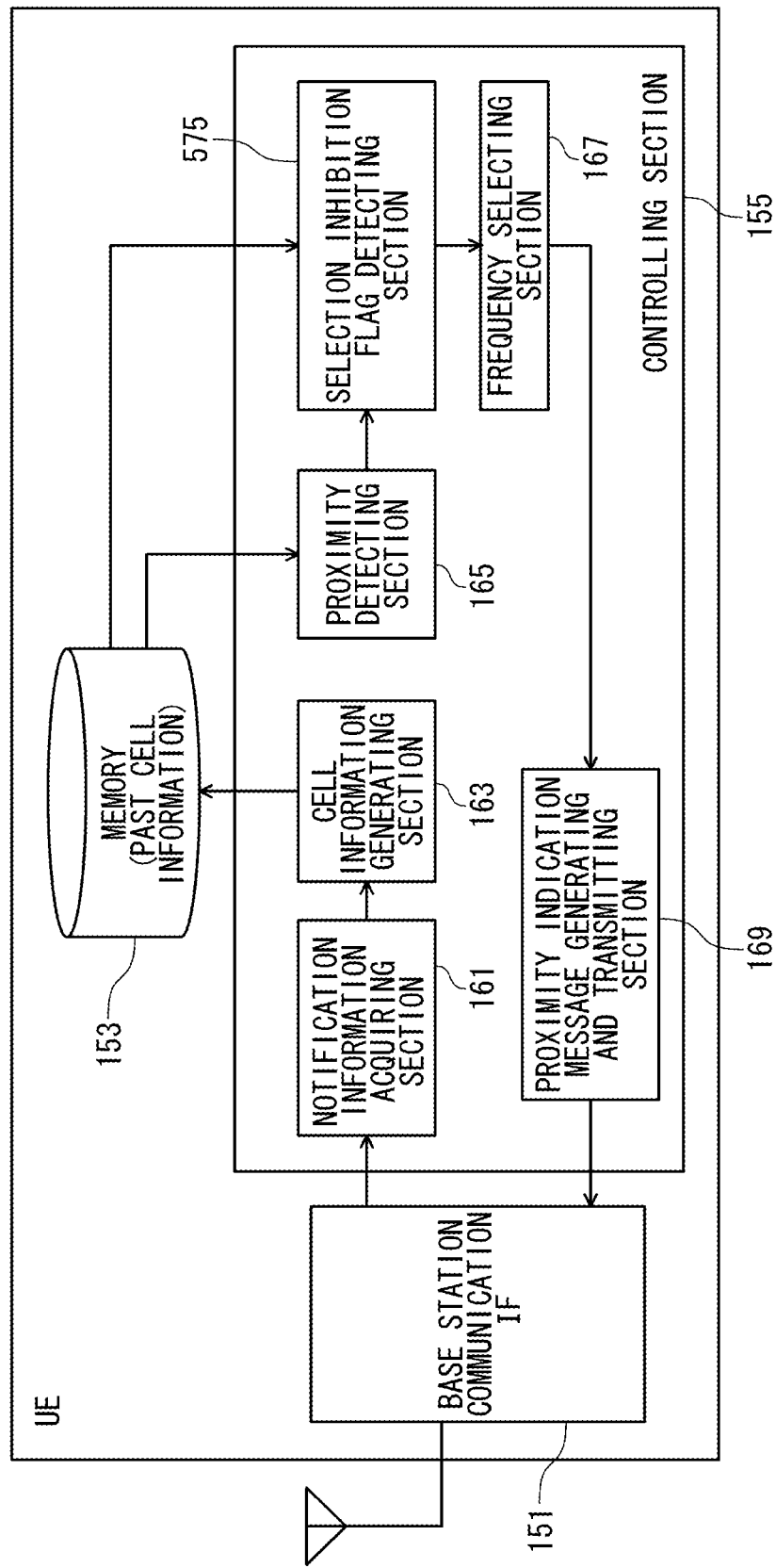
FIG. 14 shows the configuration of a UE of the fifth embodiment.

FIG. 14 shows the configuration of a UE of the fifth embodiment. As shown in FIG. 14, the UE of the fifth embodiment includes a selection inhibition flag detecting section 575 in addition to the components of the UE of the first embodiment. The UE is similar to that of the first embodiment except this point, and, in FIG. 14, the components which are common to FIG. 2 are denoted by the same reference numerals. The selection inhibition flag detecting section 575 in the embodiment detects the selection inhibition flag contained in notification information.

Figure 15:
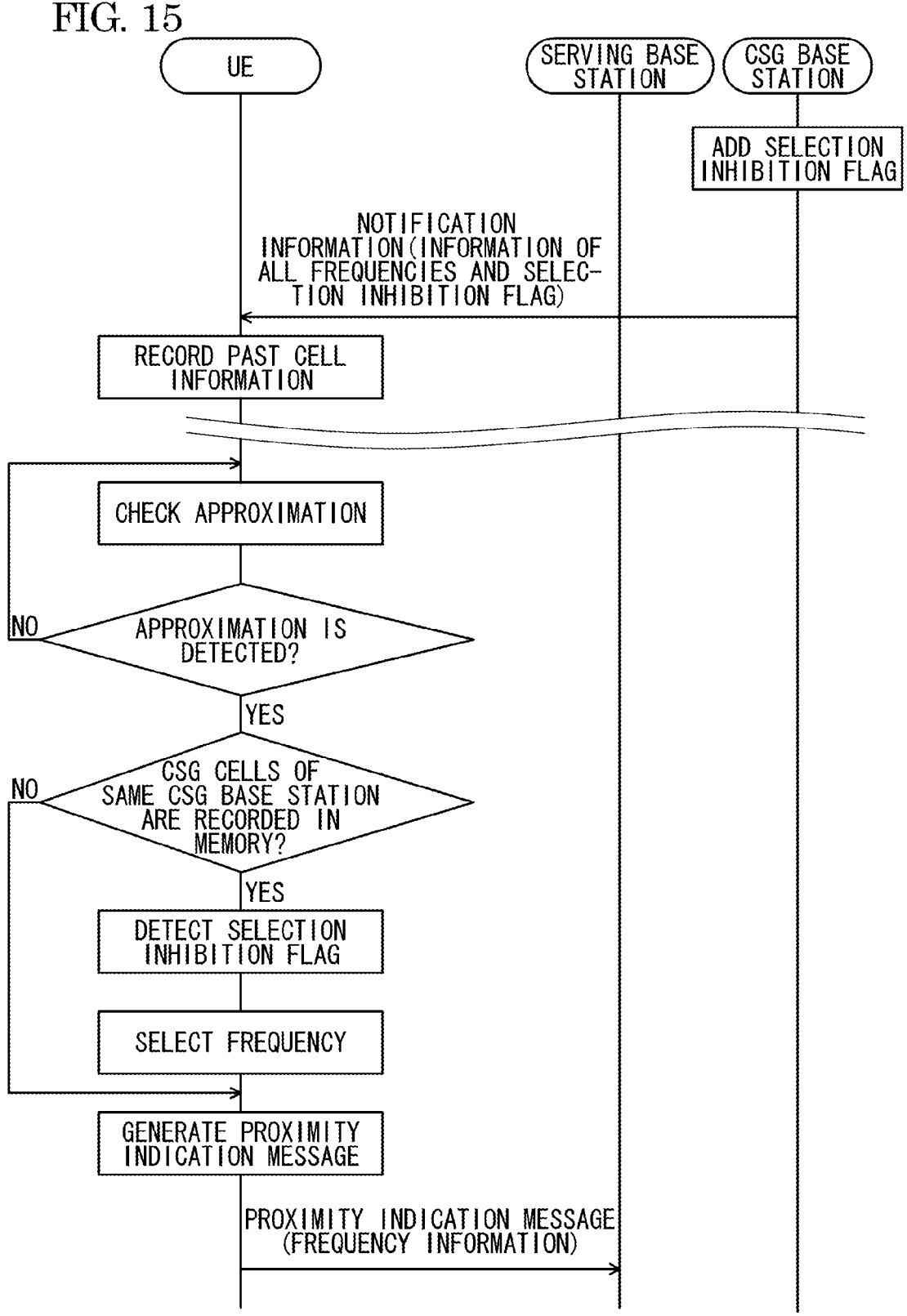
FIG. 15 is a flowchart in the fifth embodiment.

FIG. 15 is a flowchart in the system in the fifth embodiment 5. As shown in FIG. 15, a CSG base station notifies, in addition to the frequency information provided by the CSG base station, of a frequency which should not be notified by means of a proximity indication message, while adding the selection inhibition flag to the frequency. Upon receiving the notification information from the CSG base station, a UE selects one frequency from a plurality of frequencies provided by the same CSG base station, other than the frequency indicated by the selection inhibition flag, and transmits the selected frequency to the serving base station by means of a proximity indication message.

According to the embodiment, a UE can preferentially detect a CSG cell which is suitable to a handover, and then perform a handover.

Sixth Embodiment

In a sixth embodiment, in accordance with the status such as interference of peripheral cells and the traffic, a CSG base station previously selects a frequency which is to be notified by a UE by means of a proximity indication message, and notifies of it.

Figure 16:
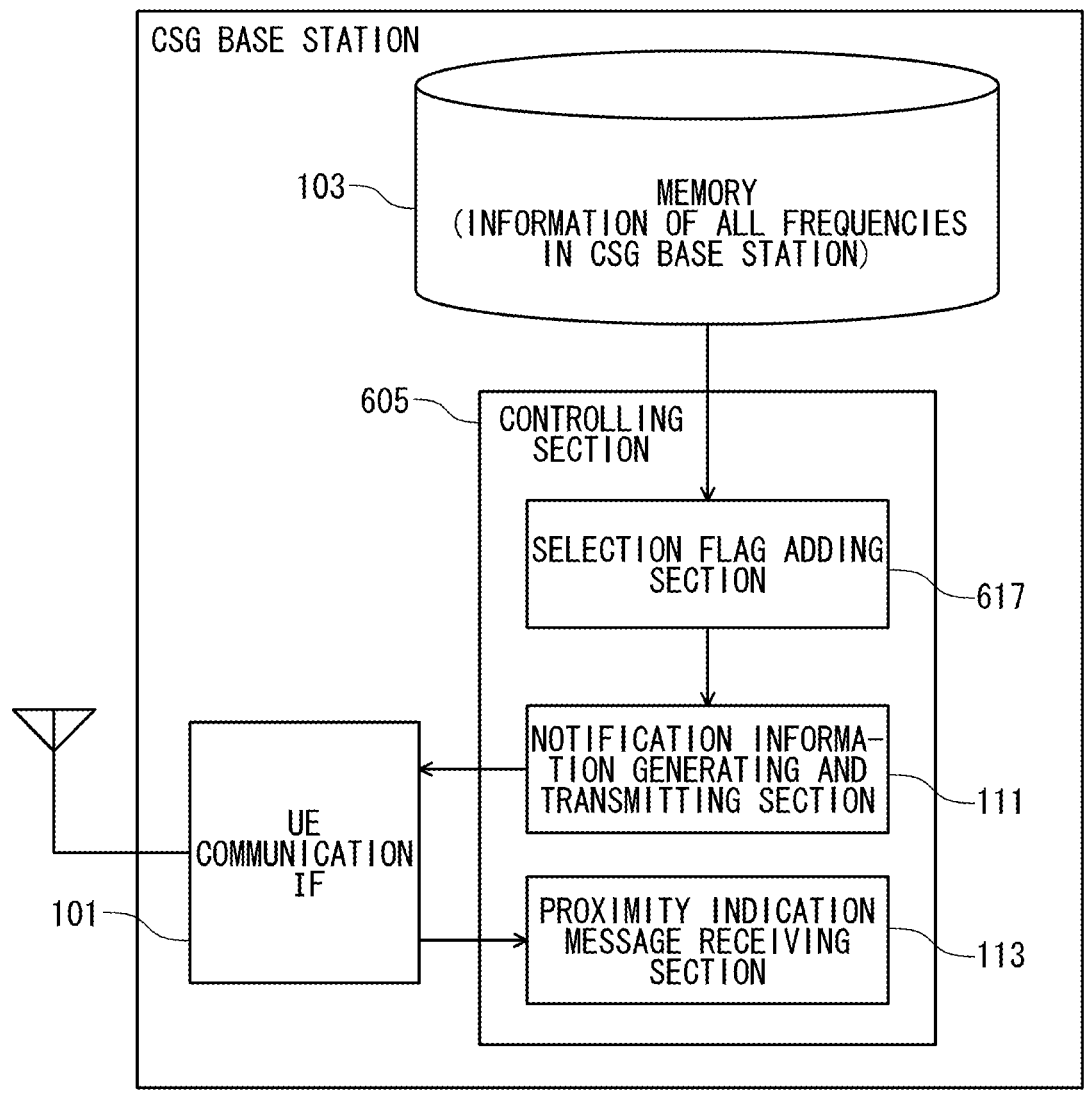
FIG. 16 shows the configuration of a CSG base station in a sixth embodiment.

FIG. 16 shows the configuration of a CSG base station in the sixth embodiment. The CSG base station in the sixth embodiment is different in a controlling section 605 from that in the first embodiment. The controlling section 605 in the sixth embodiment has a selection flag adding section 617 in addition to the components of the controlling section 105 in the first embodiment. The CSG base station is similar to that in the first embodiment except this point, and, in FIG. 16, the components which are common to FIG. 1 are denoted by the same reference numerals. The selection flag adding section 617 in the embodiment adds a selection flag to a frequency which should be notified by means of a proximity indication message.

Figure 17:
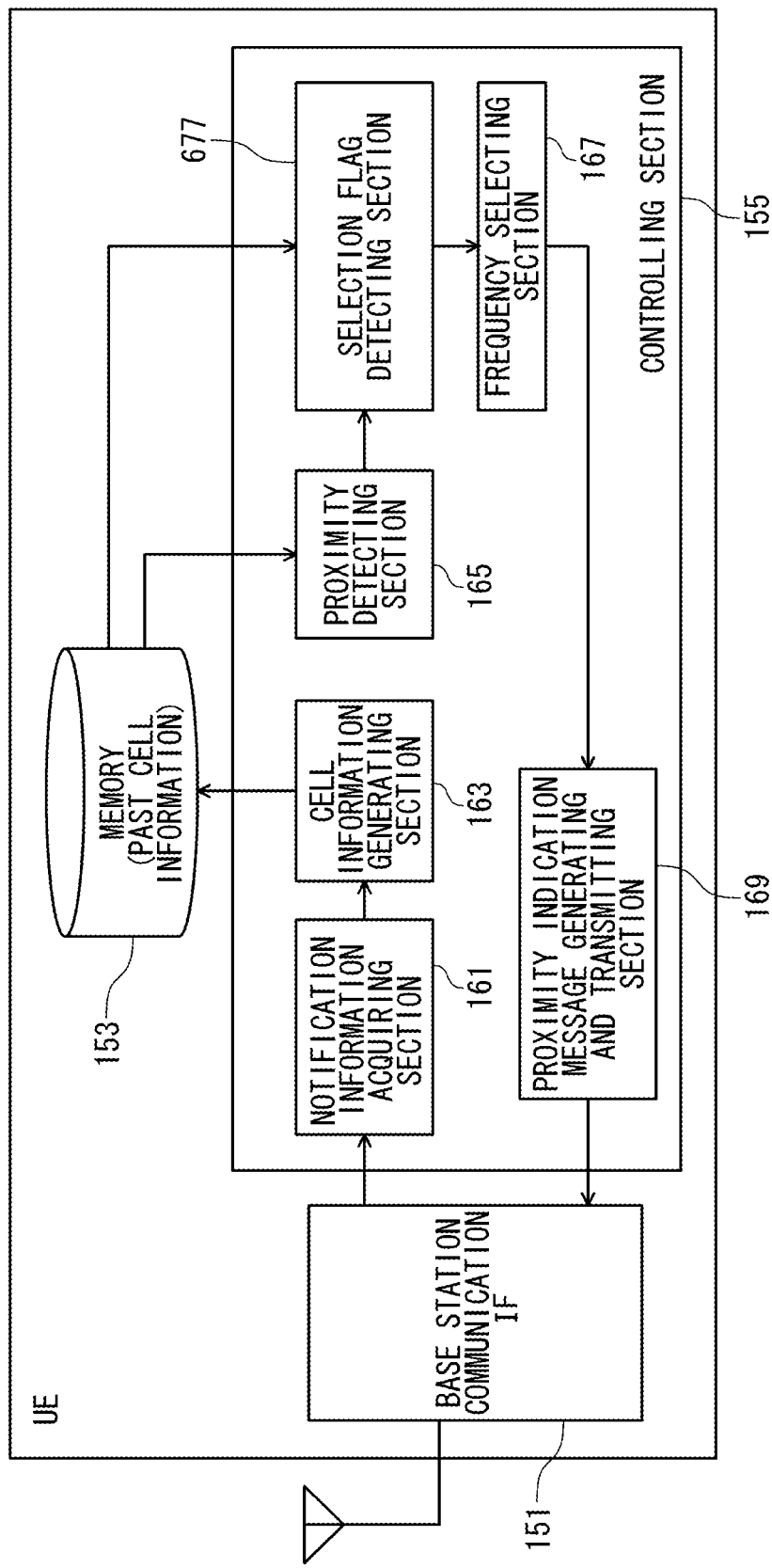
FIG. 17 shows the configuration of a UE of the sixth embodiment.

FIG. 17 shows the configuration of a UE of the sixth embodiment. As shown in FIG. 17, the UE of the sixth embodiment includes a selection flag detecting section 677 in addition to the components of the UE of the first embodiment. The UE is similar to that of the first embodiment except this point, and, in FIG. 17, the components which are common to FIG. 2 are denoted by the same reference numerals. The selection flag detecting section 677 in the embodiment detects the selection flag contained in notification information.

Figure 18:
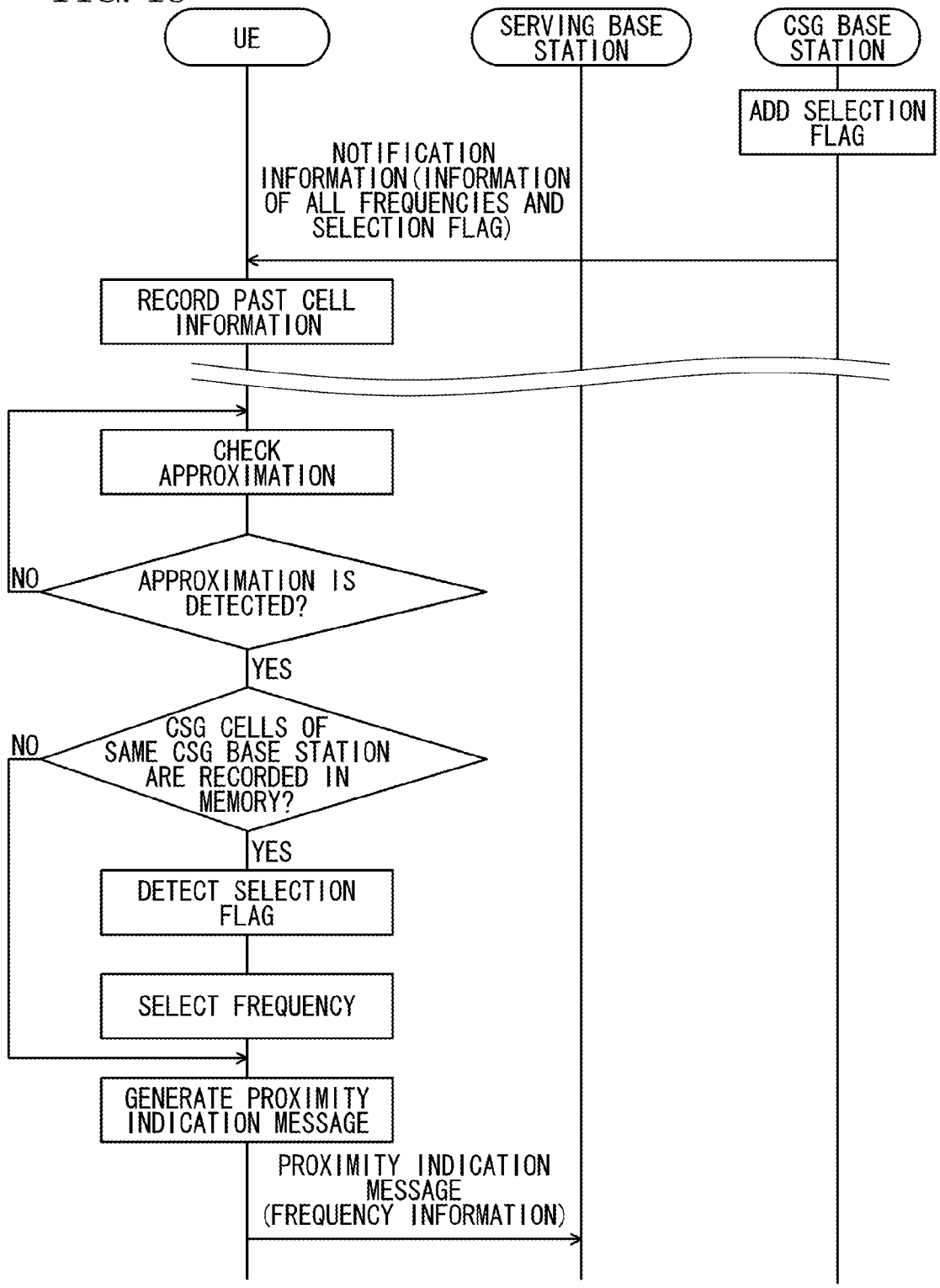
FIG. 18 is a flowchart in the sixth embodiment.
Figure 19:
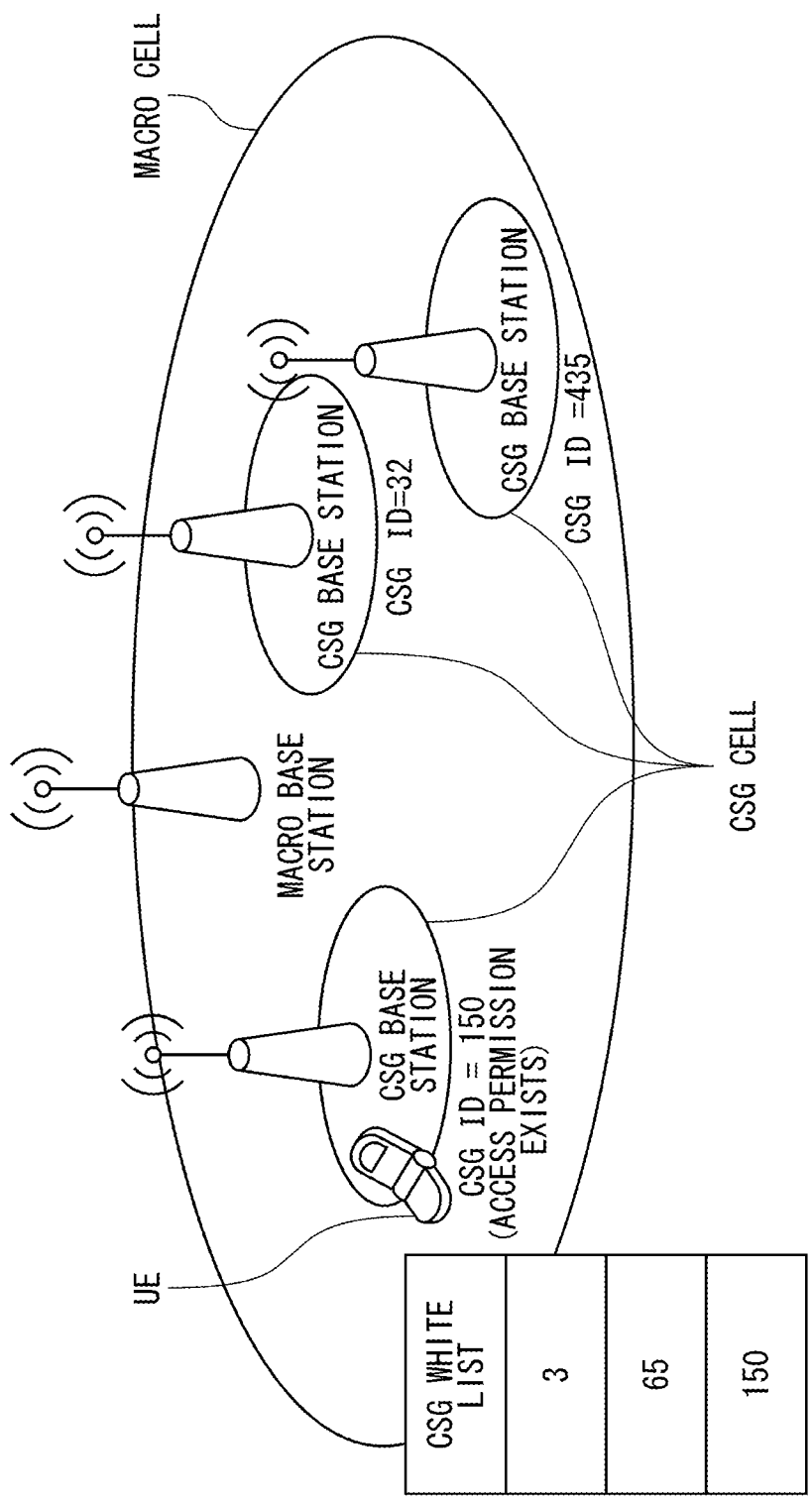
FIG. 19 shows the architecture configuration of a CSG base station
Figure 20:
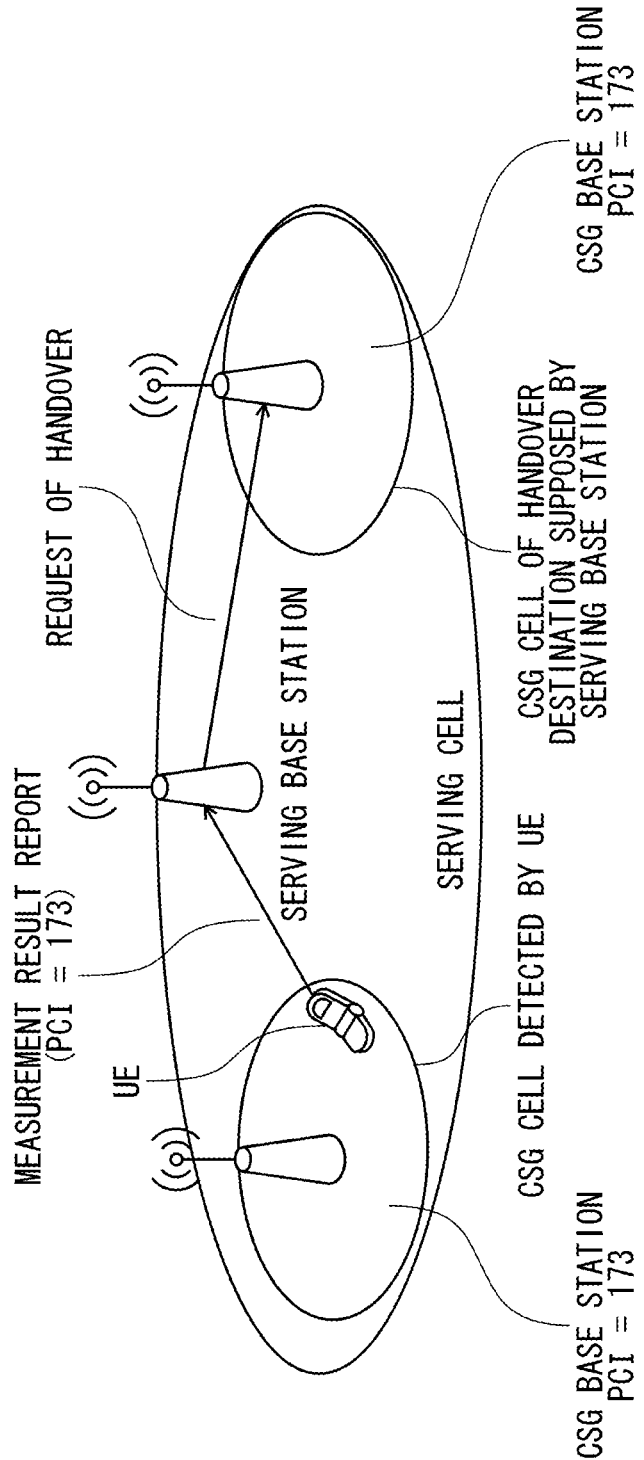
FIG. 20 shows PCI confusion.
Figure 21:
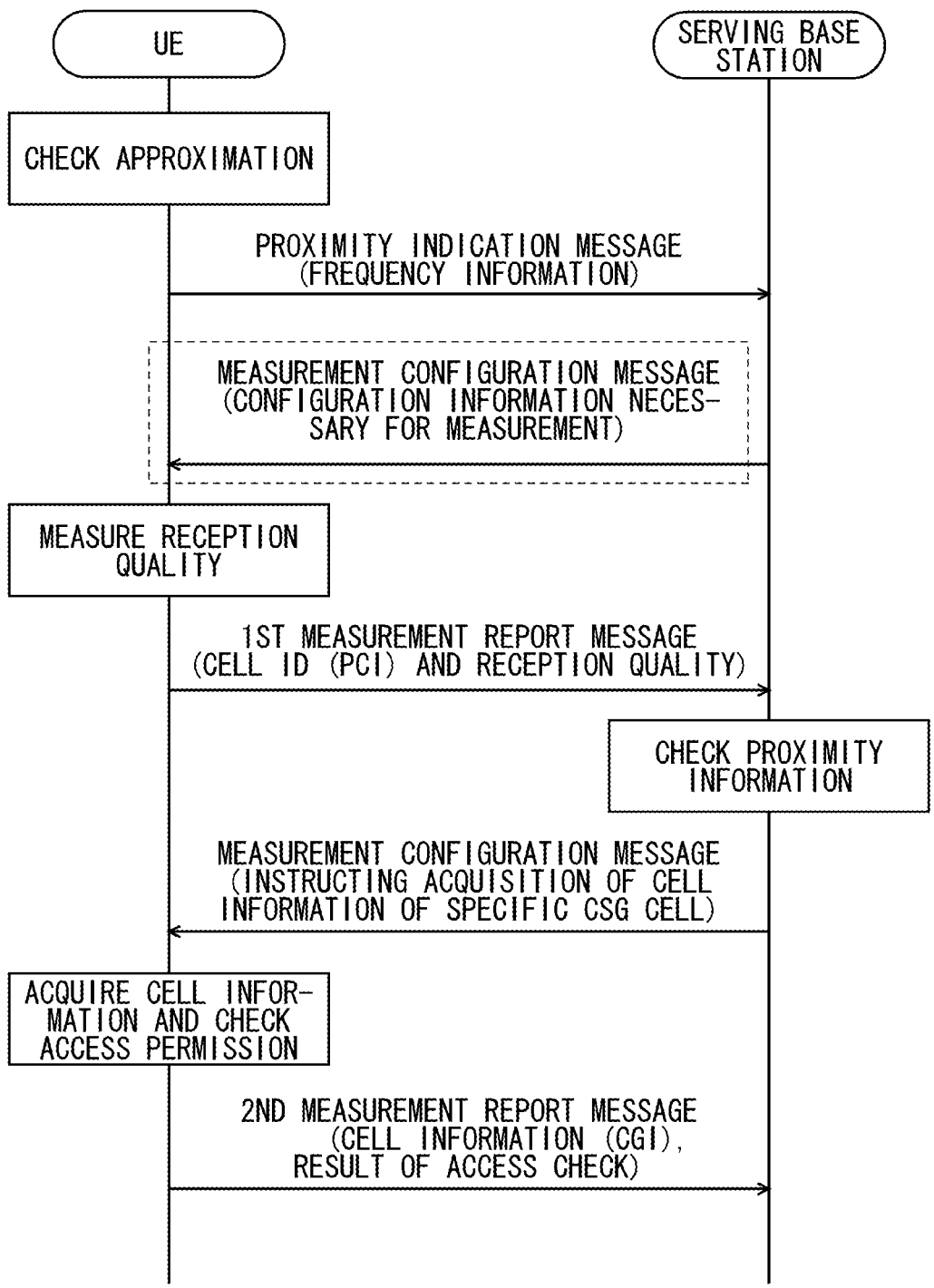
FIG. 21 shows the procedure for a measurement report message containing a CSG cell.
Figure 22:
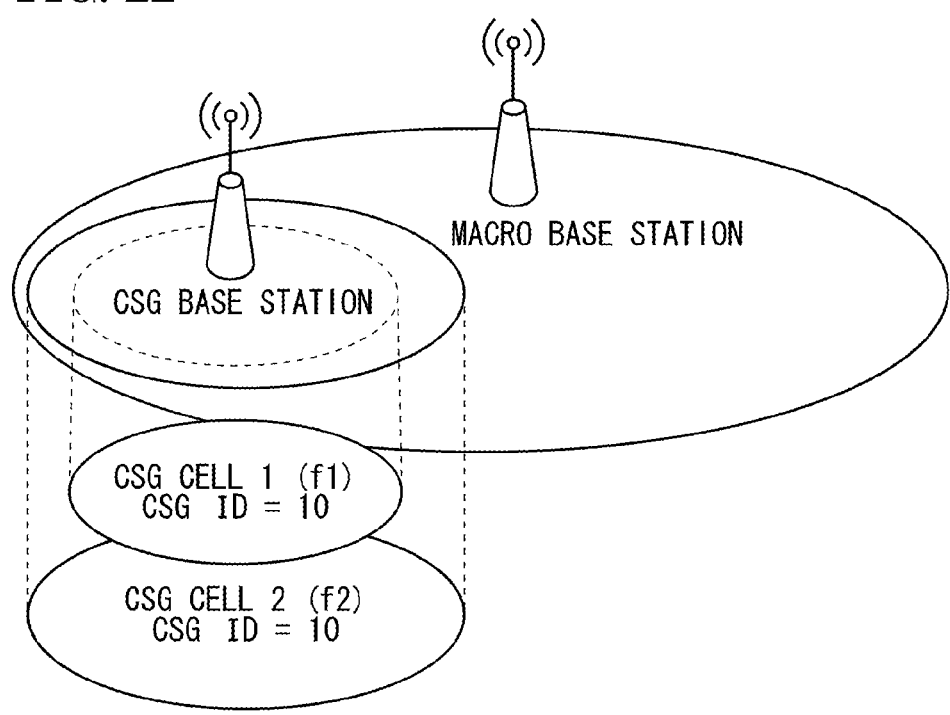
FIG. 22 shows a CSG base station which provides a plurality of frequencies and a plurality of cells.

FIG. 18 is a flowchart in the system in the sixth embodiment. As shown in FIG. 18, a CSG base station notifies, in addition to the frequency information provided by the CSG base station, of a frequency which should be notified by means of a proximity indication message, while adding the selection flag to the frequency. Upon receiving the notification information from the CSG base station, a UE selects the frequency which is indicated by the selection flag, from a plurality of frequencies provided by the same CSG base station, and transmits the selected frequency to the serving base station by means of a proximity indication message.

According to the embodiment, it is not necessary for a UE to select a frequency, and hence the process of the UE can be reduced.

In the above-described embodiments, the notification information contains the frequency priority information indicating the priority to each of the frequencies of access-restricted cells provided by the base station that provides the access-restricted cells, and the frequency selecting section selects one frequency having the highest priority which is indicated by the frequency priority information, from the plurality of frequencies provided by the base station that provides the access-restricted cells.

Moreover, the notification information contains the coverage information indicative of the coverage of each of the access-restricted cells provided by the base station that provides the access-restricted cells, and, from the plurality of frequencies provided by the base station that provides the access-restricted cells, the frequency selecting section selects one frequency corresponding to an access-restricted cell having the largest coverage.

The communication terminal includes: a frequency determining section which determines whether the frequency of the currently connected cell is contained in the plurality of frequencies provided by the base station that provides the access-restricted cell to which the communication terminal approximates or not; and a traveling speed determining section which determines the traveling speed of the communication terminal, the notification information contains coverage information which is information related to the coverage of each of the access-restricted cells provided by the station that provides the access-restricted cells, in the case where the frequency of the currently connected cell is contained in the plurality of frequencies provided by the base station that provides the access-restricted cells, the frequency selecting section selects one frequency corresponding to an access-restricted cell having the largest coverage, from the plurality of frequencies provided by the base station that provides the access-restricted cell, and, in the case where the frequency of the currently connected cell is not contained in the plurality of frequencies provided by the base station that provides the access-restricted cells, the frequency selecting section selects one frequency corresponding to an access-restricted cell having the smallest coverage, from the plurality of frequencies provided by the base station that provides the access-restricted cells when the traveling speed of the communication terminal is equal to or larger than a predetermined threshold, and, when the traveling speed of the communication terminal is smaller than the predetermined threshold, the frequency selecting section selects one frequency corresponding to an access-restricted cell having the largest coverage, from the plurality of frequencies provided by the base station that provides the access-restricted cells.

Moreover, the notification information contains the selection inhibition flag which is added to the frequency that should not be notified by the communication terminal by means of the proximity indication message, and the frequency selecting section selects one frequency from the plurality of frequencies provided by the base station that provides the access-restricted cells, except for the frequency indicated by the selection inhibition flag.

Furthermore, the notification information contains the selection flag which is added to the frequency that should be notified by the communication terminal by means of the proximity indication message, and the frequency selecting section selects a frequency indicated by the selection flag from the plurality of frequencies provided by the base station that provides the access-restricted cells.

Although the present embodiments have provided explanations by means of taking, as examples, a case where the present invention is configured by means of hardware, the present invention can also be implemented by software.

The respective function blocks used for describing the embodiments are typically implemented by LSIs that are integrated circuits. The function blocks can also be individually realized as single chips or as a single chip including some or all of the function blocks. Although the functional blocks are embodied as LSIs, they are sometimes called an IC, a system LSI, a super LSI, and an ultra-LSI according to a degree of integration.

The technique for integrating the function blocks into circuitry is not limited to LSI technology, and the function blocks can also be implemented by means of a custom-designed circuit or a general-purpose processor. Further, an FPGA (Field Programmable Gate Array) capable of being programmed after manufacture of an LSI and a reconfigurable processor whose connections or settings of circuit cells in an LSI can be reconfigured can also be utilized.

Further, if a technique for integrating circuits replaceable with the LSI technology by virtue of advancement of the semiconductor technology or another technique derived from advancement of the semiconductor technology has emerged, the function blocks can naturally be integrated by use of the technique. Adaptation of biotechnology is feasible.

Although the present invention has been described in detail based on particular embodiments, it is apparent to those skilled in the art that various changes and modifications may be made without departing from the spirit and scope of the present invention.

The present patent application is based on Japanese Patent Application (No. 2010-007176) filed on Jan. 15, 2010, the contents of which are incorporated herein by reference.

INDUSTRIAL APPLICABILITY

The invention is useful as a communication terminal or the like which, when approximating to an access-restricted cell provided by a base station that supports a plurality of access-restricted cells at different frequencies, transmits a proximity indication message to a currently connected base station with a reduced signaling amount.

REFERENCE SIGNS LIST

101: UE communication interface section (UE communication IF)
103, 203, 303: memory
105, 505, 605: controlling section
111, 211, 311: notification information generating and transmitting section
113: proximity indication message receiving section
515: selection inhibition flag adding section
617: selection flag adding section
151: base station communication interface section (base station communication IF)
153: memory
155: controlling section
161: notification information acquiring section
163: cell information generating section
165: proximity detecting section
167, 267, 367: frequency selecting section
169: proximity indication message generating and transmitting section
471: serving frequency determining section
473: traveling speed determining section
575: selection inhibition flag detecting section
677: selection flag detecting section

The invention claimed is:

1. A communication terminal which transmits a proximity indication message to a first base station that provides a currently connected cell when approximating to an access-restricted cell provided by a second base station that supports a plurality of access-restricted cells at different frequencies, the communication terminal comprising one or more integrated circuits configured to:
acquire notification information containing information related to all frequencies allocated to the access-restricted cells supported by the second base station;
store frequency information for a plurality of access-restricted cells that were accessible in the past;
select one arbitrary frequency from the stored frequency information when detecting that the communication terminal approximates to an access-restricted cell from the plurality of the access-restricted cells that were accessible in the past, based on the acquired notification information and the stored frequency information; and
transmit the proximity indication message containing the selected frequency, to the first base station.

2. The communication terminal according to claim 1, wherein
the notification information contains frequency priority information indicating a priority to each frequency of access-restricted cells provided by the second base station, and
the selected frequency is a frequency having a highest priority which is indicated by the frequency priority information, from a plurality of frequencies provided by the second base station.

3. The communication terminal according to claim 1, wherein
the notification information contains coverage information indicative of a coverage of each of the plurality of access-restricted cells supported by the second base station, and,
the selected frequency is a frequency corresponding to an access-restricted cell having the largest coverage from a plurality of frequencies provided by the second base station.

4. The communication terminal according to claim 1, further configured to determine: whether a frequency of the currently connected cell is contained in a plurality of frequencies provided by the second base station that provides the access-restricted cell to which the communication terminal approximates or not; and
a traveling speed of the communication terminal, wherein
the notification information contains coverage information which is information related to a coverage of each of the plurality of access-restricted cells supported by the second base station,
when the frequency of the currently connected cell is contained in the plurality of frequencies provided by the second base station, the selected frequency is a frequency corresponding to an access-restricted cell having a largest coverage, from the plurality of frequencies provided by the second base station, and
when the frequency of the currently connected cell is not contained in the plurality of frequencies provided by the second base station, the selected frequency is a frequency corresponding to an access-restricted cell having a smallest coverage, from the plurality of frequencies provided by the second base station when a traveling speed of the communication terminal is equal to or larger than a predetermined threshold, and the selected frequency is a frequency corresponding to an access-restricted cell having a largest coverage, from the plurality of frequencies provided by second the base station when the traveling speed of the communication terminal is smaller than the predetermined threshold.

5. The communication terminal according to claim 1, wherein
the notification information contains a selection inhibition flag which is added to a frequency that should not be notified by the communication terminal by means of the proximity indication message, and
the selected frequency is selected from a plurality of frequencies provided by the second base station, except for the frequency indicated by the selection inhibition flag.

6. The communication terminal according to claim 1, wherein
the notification information contains a selection flag which is added to a frequency which should be notified by the communication terminal by means of the proximity indication message, and
the selected frequency is a frequency indicated by the selection flag from a plurality of frequencies provided by the second base station.

7. A communication method executed by a communication terminal which transmits a proximity indication message to a first base station that provides a currently connected cell when approximating to an access-restricted cell provided by a second base station that supports a plurality of access-restricted cells at different frequencies, the communication method comprising:
a notification information acquiring step of acquiring notification information containing information related to all frequencies allocated to the plurality of access-restricted cells supported by the second base station;
a frequency information storing step of storing frequency information for a plurality of access-restricted cells that were accessible in the past;

a frequency selecting step of selecting one arbitrary frequency from a plurality of frequencies stored during the frequency information storing step when detecting that the communication terminal approximates to an access-restricted cell from the plurality of the access-restricted cells that were accessible in the past, based on the notification information acquired in the notification information acquiring step and the frequency information stored in the frequency information storing step; and a transmitting step of transmitting the proximity indication message containing the frequency selected in the frequency selecting step, to the first base station.

\* \* \* \* \*